US007620718B2

(12) United States Patent
Motoyama et al.

(10) Patent No.: US 7,620,718 B2
(45) Date of Patent: Nov. 17, 2009

(54) SYSTEM AND METHOD TO PROVIDE INTEGRATED DEVICE, USER, AND ACCOUNT INFORMATION TO USERS

(75) Inventors: Tetsuro Motoyama, Cupertino, CA (US); Christopher Meyer, Snellville, GA (US); Yasuhiko Hosoe, Norcross, GA (US); Makoto Mimura, Duluth, GA (US); Bob Rhodes, Lawrenceville, GA (US)

(73) Assignees: Ricoh Company, Ltd., Tokyo (JP); Ricoh Americas Corporation, West Caldwell, NJ (US)

( * ) Notice: Subject to any disclaimer, the term of this patent is extended or adjusted under 35 U.S.C. 154(b) by 0 days.

(21) Appl. No.: 12/030,623

(22) Filed: Feb. 13, 2008

(65) Prior Publication Data

US 2008/0147433 A1   Jun. 19, 2008

Related U.S. Application Data

(63) Continuation of application No. 10/913,450, filed on Aug. 9, 2004, now Pat. No. 7,359,969.

(51) Int. Cl.
*G06F 13/00* (2006.01)
(52) U.S. Cl. .................... 709/224; 709/219; 709/225
(58) Field of Classification Search .................. 709/217, 709/219, 223, 224, 250
See application file for complete search history.

(56) References Cited

U.S. PATENT DOCUMENTS

| | | | |
|---|---|---|---|
| 5,220,674 A | 6/1993 | Morgan et al. | |
| 5,774,678 A | 6/1998 | Motoyama | |
| 5,819,110 A | 10/1998 | Motoyama | |
| 6,317,848 B1 | 11/2001 | Sorens et al. | |
| 6,473,812 B2 | 10/2002 | Motoyama | |
| 6,631,247 B1 | 10/2003 | Motoyama et al. | |
| 6,839,717 B1 | 1/2005 | Motoyama et al. | |
| 6,879,984 B2 | 4/2005 | Duddleson et al. | |
| 6,889,263 B2 | 5/2005 | Motoyama | |
| 6,889,264 B2 | 5/2005 | Clough et al. | |
| 6,928,493 B2 | 8/2005 | Motoyama | |
| 6,970,952 B2 | 11/2005 | Motoyama | |
| 7,053,767 B2 | 5/2006 | Petite et al. | |
| 7,120,707 B2 | 10/2006 | Motoyama | |
| 7,185,080 B1 | 2/2007 | Motoyama | |

(Continued)

OTHER PUBLICATIONS

U.S. Appl. No. 12/276,951, filed Nov. 24, 2008, Motoyama.

(Continued)

*Primary Examiner*—Viet Vu
(74) *Attorney, Agent, or Firm*—Oblon, Spivak, McClelland, Maier & Neustadt, L.L.P.

(57) ABSTRACT

A system and method for managing and servicing a device communicatively coupled to a network, including: receiving device information, including alert information and status information, from the device over the network; storing the received device information; storing business context information, including contract management information, billing management information, and order management information related to managing and servicing the device; storing user access information, the user access information governing access to the stored device information and the stored business context information of the device by a plurality of users; and providing the stored device information and the business context information to a user of the plurality of users based on the stored user access information.

45 Claims, 19 Drawing Sheets

U.S. PATENT DOCUMENTS

| | | |
|---|---|---|
| 7,194,560 B2 | 3/2007 | Motoyama |
| 7,209,952 B2 | 4/2007 | Fong et al. |
| 7,289,995 B2 | 10/2007 | Motoyama et al. |
| 7,293,081 B2 | 11/2007 | Motoyama et al. |
| 7,296,079 B2 | 11/2007 | Motoyama et al. |
| 7,337,242 B1 | 2/2008 | Motoyama et al. |
| 7,349,964 B2 | 3/2008 | Motoyama et al. |
| 7,434,053 B2 * | 10/2008 | Parry et al. ............... 713/171 |
| 7,487,233 B2 * | 2/2009 | Iwamoto et al. ............. 709/223 |
| 2002/0111887 A1 | 8/2002 | McFarlane et al. |
| 2003/0055953 A1 | 3/2003 | Motoyama et al. |
| 2003/0061104 A1 | 3/2003 | Thomson et al. |
| 2003/0145128 A1 * | 7/2003 | Baird et al. ............... 709/321 |
| 2003/0172138 A1 * | 9/2003 | McCormack et al. ....... 709/220 |
| 2003/0177227 A1 | 9/2003 | Motoyama et al. |
| 2003/0233285 A1 | 12/2003 | Liu et al. |
| 2004/0030779 A1 | 2/2004 | Motoyama et al. |
| 2004/0068549 A1 | 4/2004 | Motoyama |
| 2004/0255021 A1 | 12/2004 | Motoyama et al. |
| 2004/0268211 A1 | 12/2004 | Huff |
| 2005/0033872 A1 | 2/2005 | Motoyama |
| 2005/0063367 A1 | 3/2005 | Motoyama |
| 2005/0071444 A1 | 3/2005 | Motoyama |
| 2005/0071483 A1 | 3/2005 | Motoyama |
| 2005/0108383 A1 | 5/2005 | DeHaas et al. |
| 2005/0165926 A1 | 7/2005 | Motoyama et al. |
| 2005/0165927 A1 | 7/2005 | Motoyama et al. |
| 2005/0177642 A1 | 8/2005 | Motoyama et al. |
| 2005/0240939 A1 | 10/2005 | Motoyama et al. |
| 2006/0031155 A1 | 2/2006 | Motoyama et al. |
| 2006/0031390 A1 | 2/2006 | Motoyama et al. |
| 2006/0059255 A1 | 3/2006 | Motoyama et al. |
| 2006/0069767 A1 | 3/2006 | Motoyama et al. |
| 2006/0075097 A1 | 4/2006 | Motoyama |
| 2006/0080429 A1 | 4/2006 | Motoyama et al. |
| 2006/0085535 A1 | 4/2006 | Motoyama et al. |
| 2006/0155824 A1 | 7/2006 | Motoyama et al. |
| 2006/0155845 A1 | 7/2006 | Motoyama et al. |
| 2006/0155846 A1 | 7/2006 | Motoyama et al. |
| 2006/0168063 A1 | 7/2006 | Motoyama |
| 2006/0168085 A1 | 7/2006 | Motoyama |
| 2006/0168197 A1 | 7/2006 | Motoyama et al. |
| 2006/0184659 A1 | 8/2006 | Motoyama et al. |
| 2007/0027951 A1 | 2/2007 | Motoyama et al. |
| 2007/0150543 A1 | 6/2007 | Fong et al. |
| 2008/0028091 A1 | 1/2008 | Motoyama et al. |
| 2008/0040480 A1 | 2/2008 | Motoyama et al. |
| 2008/0065766 A1 | 3/2008 | Motoyama et al. |

OTHER PUBLICATIONS

U.S. Appl. No. 07/549,278, filed Jul. 6, 1990, Motoyama.
U.S. Appl. No. 09/393,677, filed Sep. 10, 1999, Motoyama, et al.
U.S. Appl. No. 09/575,710, filed Jul. 25, 2000, Motoyama, et al.
U.S. Appl. No. 10/225,290, filed Aug. 22, 2002, Motoyama.
U.S. Appl. No. 10/372,939, filed Feb. 26, 2003, Motoyama.
U.S. Appl. No. 11/960,248, filed Dec. 19, 2007, Motoyama et al.
U.S. Appl. No. 12/029,508, filed Feb. 12, 2008, Motoyama et al.

* cited by examiner

SYSTEM AND METHOD TO PROVIDE INTEGRATED DEVICE, USER, AND ACCOUNT INFORMATION TO USERS

CROSS-REFERENCE TO RELATED APPLICATIONS

This continuation application claims the benefit of priority under 35 U.S.C. §120 to application Ser. No. 10/913,450, filed Aug. 9, 2004 (now U.S. Pat. No. 7,359,969) which is hereby incorporated by reference in its entirety. The present application is also related to the following commonly owned U.S. patent applications, which are hereby incorporated by reference in their entirety:

1. Ser. No. 09/408,443 (RSID 1-272), filed Sep. 29, 1999 (now U.S. Pat. No. 6,631,247);
2. Ser. No. 10/665,536 (RSID 1-272-1), filed Sep. 22, 2003;
3. Ser. No. 10/638,540 (RSID 1-272-2), filed Aug. 12, 2003 (now U.S. Pat. No. 7,383,359);
4. Ser. No. 10/660,527 (RSID 1-272-3), filed Sep. 12, 2003 now U.S. Pat. No. 7,293,081);
5. Ser. No. 08/738,659 (RSID 1-154-8), filed Oct. 30, 1996 now U.S. Pat. No. 6,889,263);
6. Ser. No. 08/463,002 (RSID 1-154-4), filed Jun. 5, 1995, now U.S. Pat. No. 5,819,110;
7. Ser. No. 09/393,677 (RSID 1-274), filed Sep. 10, 1999 (now U.S. Pat. No. 7,533,344);
8. Ser. No. 09/953,359 (RSID 1-345), filed Sep. 17, 2001 (now U.S. Pat. No. 7,536,450);
9. Ser. No. 09/975,939 (RSID 1-348), filed Oct. 15, 2001 (now U.S. Pat. No. 6,839,717);
10. Ser. No. 10/068,861 (RSID 1-358), filed Feb. 11, 2002 (now U.S. Pat. No. 7,337,242);
11. Ser. No. 10/142,991 (RSID 1-366), filed May 13, 2002 (now U.S. Pat. No. 7,209,952);
12. Ser. No. 10/157,903 (RSID 1-376), filed May 31, 2002;
13. Ser. No. 10/225,290 (RSID 1-388), filed Aug. 22, 2002;
14. Ser. No. 10/328,003 (RSID 1-393) filed Dec. 26, 2002 (now U.S. Pat. No. 7,289,995);
15. Ser. No. 10/372,939 (RSID 1-405), filed Feb. 26, 2003 (now U.S. Pat. No. 7,437,452);
16. Ser. No. 10/460,151 (RSID 1-409), filed Jun. 13, 2003 (hereinafter U.S. Pat. No. 7,533,167);
17. Ser. No. 10/670,604 (RSID 1-419), filed Sep. 26, 2003;
18. Ser. No. 10/764,582 (RSID 1-421), filed Jan. 27, 2004 (hereinafter U.S. Pat. No. 7,296,079);
19. Ser. No. 10/913,337 (RSID 1-425), filed Aug. 9, 2004;
20. Ser. No. 10/913,431 (RSID 1-426), filed Aug. 9, 2004; and
21. Ser. No. 10/913,364 (RSID 1-428), filed Aug. 9, 2004.

BACKGROUND OF THE INVENTION

1. Field of the Invention

The present invention relates generally to the use of a network to support clients of a service who use devices provide by a service company. The invention is more particularly related to the three major components integrated at the service provider company. One component handles device-related information. The second component handles user-related information, and the third component handles account-related information. All three components are connected to provide for the exchange of necessary information to define the context and rules of processing of the information and processing of requests from devices or system users. The invention is further related to a method and system to utilize multiple protocols to support devices, users, and help desks.

2. Discussion of the Background

Today, many companies support their devices at the client site remotely. Devices are either sending messages to a monitoring station or being monitored by a protocol such as SNMP. Generally, these clients are charged according to the promised service by the remote support system. Users, therefore, look for a return on their investment in terms of cost savings and time savings. This return on investment, moreover, must be shown through the obtained device data.

Many previously disclosed remote systems address the data collection aspect of the remote support systems. Such systems are interested in how to send various data from the device in the field to the service center. In many services, however, the actual service is likely to involve various contract terms, a service dispatch system, a supply ordering system, etc. The total remote support system is not an isolated system, but the combination of various systems. For example, a typical system will have a billing system, a contract management system, an order-tracking system, a sales force support system, etc. In addition, such a system must be economical and data-driven so that management can access the data for business decision-making.

At present, many report support systems deterministically support the devices in the field or require human intervention to change the system decision-making. These systems tend to respond to incoming information in a preprogrammed fashion, instead of dynamically changing based on the business context and rules.

Thus, there exists an unmet need in the art for a remote support system that includes various subsystems to accommodate decision-making and to provide a flexible response to device monitoring, according to a particular business context and rules.

SUMMARY OF THE INVENTION

One object of the present invention is to provide a remote support system that utilizes device information, user information, and account information subsystems for response and decision-making.

Another object of the present invention is to alter the device support system according to the context provided by the account subsystem, such as the contract terms and contract bidding information.

Yet another object of the present invention is to provide information according to the information stored in the user subsystem. Some information is pushed to some users while other information is pulled by qualified users.

Another object of the present invention is to provide methods to supply, for business decision makers, necessary information regarding the performance of a contract, such as return on investment and profitability.

Accordingly, there is provided a system for managing and servicing at least one device communicatively coupled to a network, comprising: (1) a communication manager configured to receive an alert and monitored information from the at least one device over the network, and to receive a user request for information related to the at least one device; (2) a device subsystem configured to store the monitored information received by the communication manager, and to store at least one of configuration and service information of the at least one device; (3) a user subsystem configured to store information related to users of the at least one device; (4) an account subsystem configured to store at least one of contract management information, billing management information, and order management information related to the at least one device; and (5) a system controller configured to coordinate operations of the device subsystem, the user subsystem, and the account subsystem in responding to the received alert and in responding to the received user request for information.

According to another aspect of the present invention there is provided a method, system, and computer program product for servicing a monitored device provided to a company, comprising: (1) receiving, by a service provider over a network, a service alert regarding the monitored device; (2) determining whether a business relationship exists between the company and the service provider for service of the monitored device; and (3) responding to the service alert based on the determined business relationship.

Further, according to one embodiment of the present invention, the step of determining whether a business relationship exists comprises: (1) determining whether a bid for a contract between the company and the service provider is pending; and (2) if the bid for the contract is pending between the company and the service provider, responding to the service alert in a predetermined manner. In addition, according to another embodiment of the present invention, the step of determining whether a business relationship exists comprises: (1) determining whether a service contract between the company and the service provider exists, wherein the service contract covers the monitored device; (2) if the determining step determines that the service contract exists, retrieving information regarding the service contract from an account subsystem of the service provider; (3) determining, based on the retrieved information, whether the service contract authorizes a response to the service alert; and (4) if the preceding determining step determines that the service contract authorizes a response to the service alert, responding to the service alert according to the service contract.

According to another aspect of the present invention there is provided a method, system, and computer program product for managing and servicing at least one device communicatively coupled to a network, comprising: (1) receiving device information, including at least one of alert information and status information, from the at least one device over the network; (2) storing the received device information; (3) storing business context information, including at least one of contract management information, billing management information, and order management information related to managing and servicing the at least one device; (4) storing user access information, the user access information governing access to the stored device information and the stored business context information of the at least one device by a plurality of users; and (5) providing at least one of the stored device information and the business context information to a user of the plurality of users based on the stored user access information According to another aspect of the present invention there is provided a method, system, and computer program product for evaluating a service contract for managing and servicing plural devices communicatively coupled to a network, comprising: (1) storing business context information, including terms of the service contract for managing and servicing at least one device of the plural devices; (2) storing contract expenditure information, including costs associated with managing and servicing the at least one device covered by the service contract; (3) receiving, from an authorized user, a request for information related to profitability of the service contract over a predetermined period of time; (4) accessing the business context information to retrieve the terms of the service contract and an identification for each device of the at least one device covered by said service contract; (5) determining, based on each respective identification, the cost of performing the service contract over the predetermined period of time for the at least one device covered by the service contract; (6) creating, based on (1) the cost of performing the service contract determined in the determining step, and (2) the retrieved terms of the service contract, a contract profitability report describing profitability of the service contract over the predetermined period of time; and (7) providing, to the authorized user, the contract profitability report and the terms of the service contract for the at least one device covered by the service contract.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
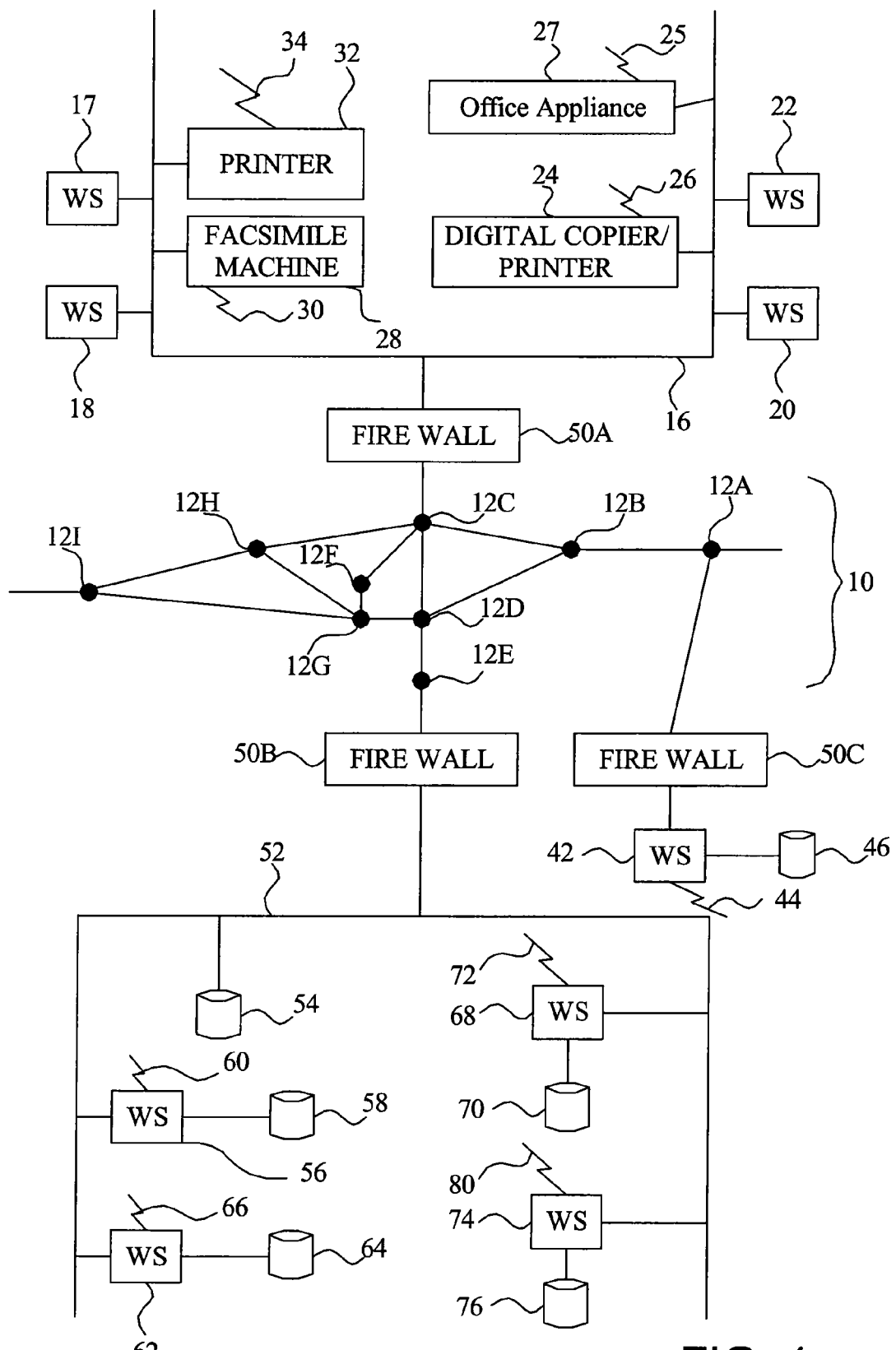
FIG. 1 illustrates three networked business office machines connected to network computers and databases through the Internet.

Referring now to the drawings, wherein like reference numerals designate identical or corresponding parts throughout the several views, FIG. 1 shows a first network 16, such as a Local Area Network ("LAN") or Wide Area Network (WAN), connected to computers and workstations, 17, 18, 20, and 22. The workstation can be any type of computer, including a Microsoft Window computer, a Unix-based computer, an Apple Macintosh, a Linux-based computer, or a laptop computer with a wireless connection. Also connected to network 16 are a digital copier/printer multi-function machine 24, an office appliance 27, such as a digital filing appliance, a facsimile machine 28, and a printer 32. The appliances/devices 24, 27, 28, and 32 are referred to as machines or monitored devices and other types of appliances/devices may be used as the machines or monitored devices including any of the appliances/devices discussed below. Also, a facsimile server (not illustrated) may be connected to the network 16 and may have a telephone, ISDN (Integrated Service Digital Network), or other communication connection. In addition to the appliances/device 24, 27, 28, and 32 being connected to the network 16, these devices may also include conventional telephone and/or cable connection and/or wireless connection 26, 25, 30, and 34 respectively. As explained below, the business office machines or business appliances/devices 24, 27, 28, and 32 communicate with a remote monitoring, diagnosis and control station, also referred to as a Service Center, through the Internet via the network 16 or by channels 26, 25, 30, and/or 34. Alternatively, Office Appliance 27 may monitor the devices 24, 30, and 32 and communicate with the Service Center through the Internet. Another alternative is that one of the computers, such as 22, acts as the internal system that exchanges the information to and from the appliances/devices 24, 27, 28, and 32 and corresponds to the Service Center.

In FIG. 1, the Internet 10 includes a plurality of interconnected computers and routers designated by 12A-12I. The manner of communicating over the Internet is known through Request For Comments ("RFC") documents obtained through the web site www.ietf.org/rfc.html. TCP/IP (Transmission Control Protocol/Internet Protocol) related communication is described for example in the book "TCP/IP Illustrated Vol. 1, The Protocol" by Stevens, from Addison-Wesley Publishing Company, 1994, which is incorporated herein by reference.

In FIG. 1, a firewall 50A is connected between the Internet 10 and the network 16. A firewall is a device or a system that allows interfacing with the Internet 10 at a carefully controlled point and prevents attackers from getting close to other network defenses. Firewalls are known and commercially available devices and/or software. Similarly, a firewall 50B is connected between the Internet 10 and a network 52. Also, a firewall 50C is connected between the Internet 10 and a workstation 42. The workstation 42 may be connected to the network 52 through VPN (Virtual Private Network). Additional details on firewalls can be found in "Building Internet Firewalls" by D. B. Chapman and E. D. Zwicky, 1995, O'Reilly & Associates, Inc. The contents of those references are incorporated herein by reference.

The network 52 is a network for a company and includes a plurality of computers and workstations, 56, 62, 68, and 74. These workstations may be located at different departments within a company such as marketing, manufacturing, design engineering, and customer service departments. In addition to the workstation connected via the network 52, there is a computer/workstation 42 which is not directly connected to the network 52. Information in a database stored in a disk 46 may be shared using proper protocols, for example establishing the Virtual Private Network (VPN), over the Internet to the computers and workstations connected directly to the network 52. Also, the computer/workstation 42 includes another communication channel 44 for redundancy. The computers and workstations 42, 56, 62, 68, and 74 described here are abstract machines and may consist of multiple of computers when implemented.

Once the information related to a monitored office device gets to the network 52, there may be a computer that parses the incoming information and routes the information to the correct destination computer/workstation for further processing. Information of the business office machines, business device, or business office appliances 24, 27, 28, and 34 may be stored in one or more of the databases stored in the disks 46, 54, 64, 70, and 76. Known databases include (1) relational databases from Microsoft, Oracle, IBM and Sybase; and (2) non-relational database including Object-Oriented database. Each of the customer service, marketing, manufacturing, and engineering departments may have their own database or may share one or more databases. Each of the disks used to store databases is a non-volatile memory such as a hard disk or an optical disk. Alternatively, the databases may be stored in any storage device including solid state and/or semiconductor memory devices. As an example, disk 64 contains the marketing database, disk 58 contains the manufacturing database, disk 70 contains the engineering database, and disk 76 contains the customer service database. Alternatively, the disks 54 and 46 store one or more of the databases.

In addition to the computers and workstations 56, 62, 68, and 74 being connected to the Internet through firewall 50B, these computers and workstations may also have different communication channels for redundancy. Such channels may include wireless communication channels.

A feature of the present invention is the use of a "store-and-forward" mode of communication (e.g., Internet electronic mail) or transmission between a set of machines/appliances/devices and a set of computers for supporting the clients who uses these machines/appliances/devices. Alternatively, the message which is transmitted may be implemented using a mode of communication that makes direct, end-to-end connection (e.g., using a socket connection to the ultimate destination) such as FTP and HTTP.

Figure 2:
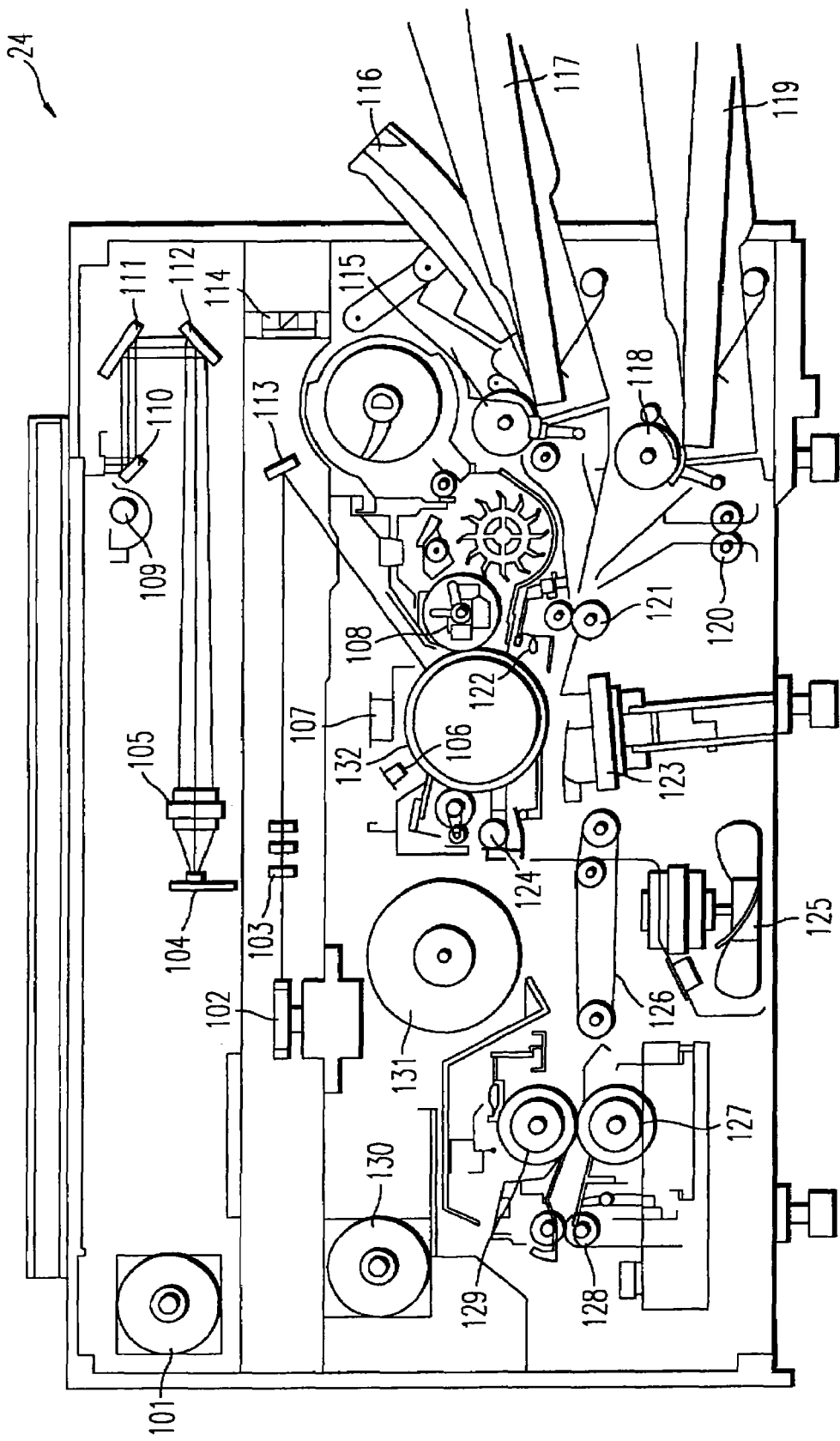
FIG. 2 illustrates the components of a digital copier/printer multi-function machine.

FIG. 2 illustrates the mechanical layout of the digital copier/printer multi-function machine 24 illustrated in FIG. 1. In FIG. 2, 101 is a fan for the scanner, 102 is a polygon mirror used with a laser printer, and 103 designates an F theta lens used to collimate light from a laser (not illustrated). Reference number 104 designates a sensor for detecting light from the scanner, 105 is a lens for focusing light from the scanner onto the sensor 104 and 106 is a quenching lamp used to erase images on the photoconductive drum 132. There is a charging corona unit 107 and a developer roller 108. Reference numeral 109 designates a lamp used to illustrate a document to be scanned and 110, 111, and 112 designate mirrors used to reflect light onto the sensor 104. There is a drum mirror 113 used to reflect light to the photoconductive drum 132 originating from the polygon mirror 102. Reference numeral 114 designates a fan used to cool the charging area of the digital copier/printer multi-function machine, and 115 is a first paper feed roller used for feeding paper from the first paper cassette 117, and 116 is a manual feed table. Similarly, element 118 is a second paper feed roller for the second cassette 119. Reference numeral 120 designates a relay roller, 121 is a registration roller, 122 is an image density sensor, and 123 is a transfer/separation corona unit. Reference numeral 124 is a cleaning unit, 125 is a vacuum fan, element 126 is a transport belt, 127 is a pressure roller, and 128 is an exit roller. Reference numeral 129 is a hot roller used to fix toner onto the paper, 130 is an exhaust fan, and 131 is the main motor used to drive the digital copier/printer multi-function machine.

Figure 3:
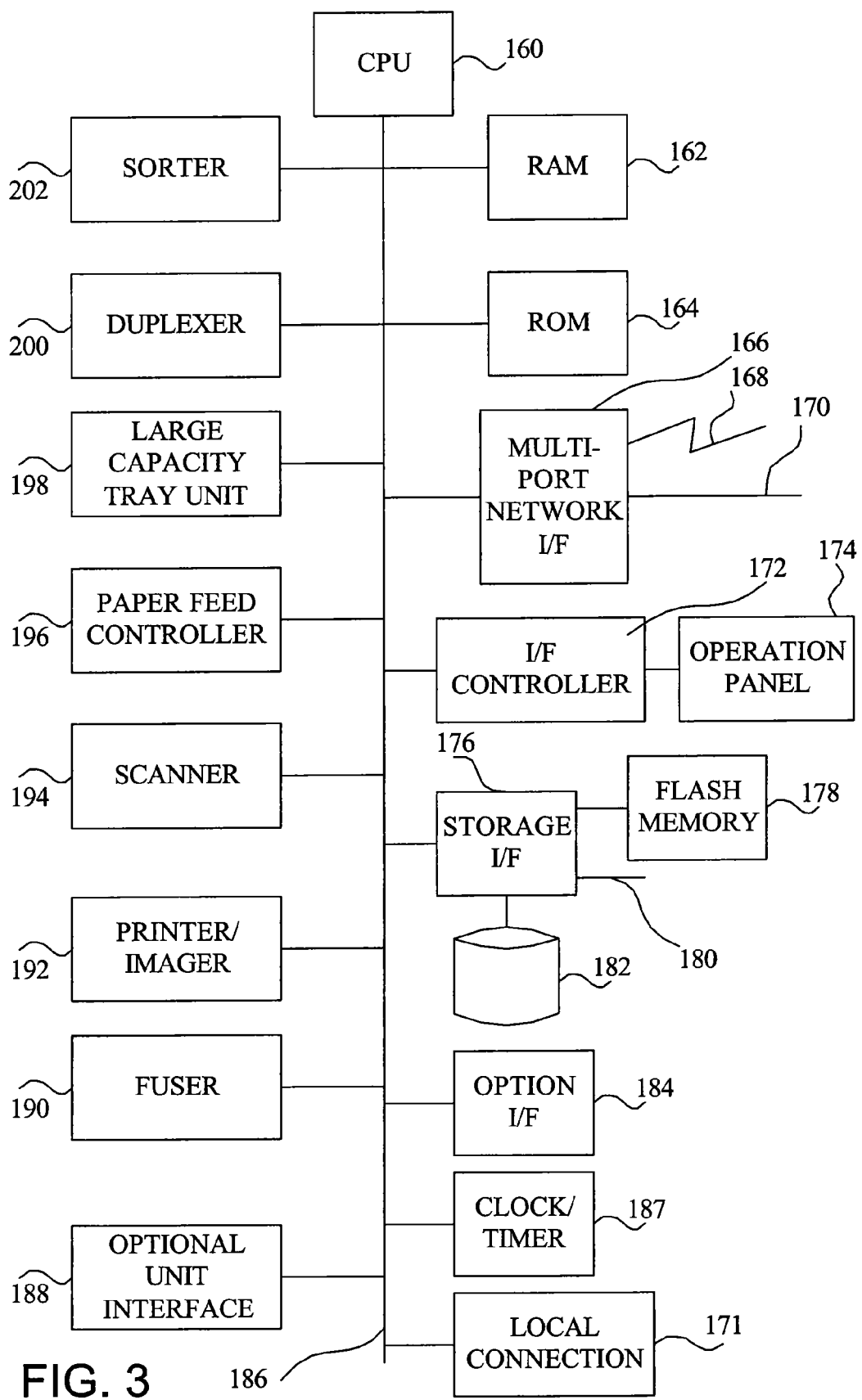
FIG. 3 illustrates the electronic components of the digital copier/printer multi-function machine illustrated in FIG. 2.

FIG. 3 illustrates a block diagram of the electronic components illustrated in FIG. 2. The CPU 160 is a microprocessor and acts as the system controller. There is a random access memory (RAM) 162 to store dynamically changing information including operating parameters of the digital copiers. A read-only memory (ROM) 164 stores the program code used to run the digital copier/printer multi-function machine and also information describing the static-state data such as model number, serial number, and default parameters that would not change over the life of the machine. When the device needs to boot up from either a hard disk or flash memory, the ROM memory 164 stores the boot sequence.

There is provided a multi-port communication interface 166, which allows the digital copier/printer multi-function machine to communicate with external devices. Reference numeral 168 represents a telephone or other communication line including a wireless channel. Further information of the multi-port communication interface is described with respect to FIG. 4. An interface controller 172 is used to connect an operation panel 174 to a system bus 186. The operation panel 174 includes standard input and output devices found on a digital copier/printer multi-function machine or business office appliance including some function buttons such as reduce/enlarge and numeric buttons, etc. Additionally, a liquid crystal display may be included within the operation panel 174 to display parameters and messages of the apparatus. The operation panel also can be a touch panel in which the display and function buttons may change according to the context.

A local connection interface 171 is a connection through local port such as RS232, USB and IEEE 1394. This interface 171 allows external devices to be attached to the apparatus.

A storage interface 176 connects storage devices to the system bus 186. The storage devise include a flash memory 178 and a disk 182. There is a connection 180 connected to the storage interface 176 which allows for additional memory devices to be connected. The flash memory 178 is used to store semi-static data which describes parameters of the device which infrequently change over the life of the apparatus, including the option configuration, network access parameters, and work group, and also can be used to store dynamic data that describes parameters dynamically changing such as print count. An option interface 184 allows additional option devices to be attached and controlled. A clock/timer 187 is utilized to keep track of both the time and date and also to measure elapsed time.

On the left side of FIG. 3, the various sections making up the digital copier/printer multi-function machine are illustrated. Reference numeral 202 designates a sorter and contains sensors and actuators used to sort the output of the digital copier/printer multi-function machine. There is a duplex 200 that allows a duplex operation to be performed and includes conventional sensors and actuators. The digital copier/printer multi-function machine includes a large capacity tray unit 198 that allows paper trays holding a large number of sheets to be used. The large capacity tray unit 198 includes conventional sensors and actuators.

A paper feed controller 196 is used to control the operation of feeding paper into and through the digital copier/printer multi-function machine. A scanner 194 is used to scan images into the machine and includes a control system of conventional scanning elements such as a light, mirror, etc. Additionally, scanner sensors are used, such as a home position sensor, to determine that the scanner is in the home position, and a lamp thermistor is used to ensure proper operation of the scanning lamp. There is a printer/imager 192, which prints the output of the digital copier/printer multi-function machine and includes a conventional laser printing mechanism, a toner sensor, and an image density sensor. The fuser 190 is used to fuse the toner onto the page using a high temperature roller and includes an exit sensor, a thermistor to assure that the fuser 190 is not over heating, and an oil sensor. Additionally, there is an optional unit interface 188 used to connect optional units such as an automatic document feeder, a different type of sorter/collator, or other elements that can be added to the digital copier/printer multi-function machine.

Figure 4:
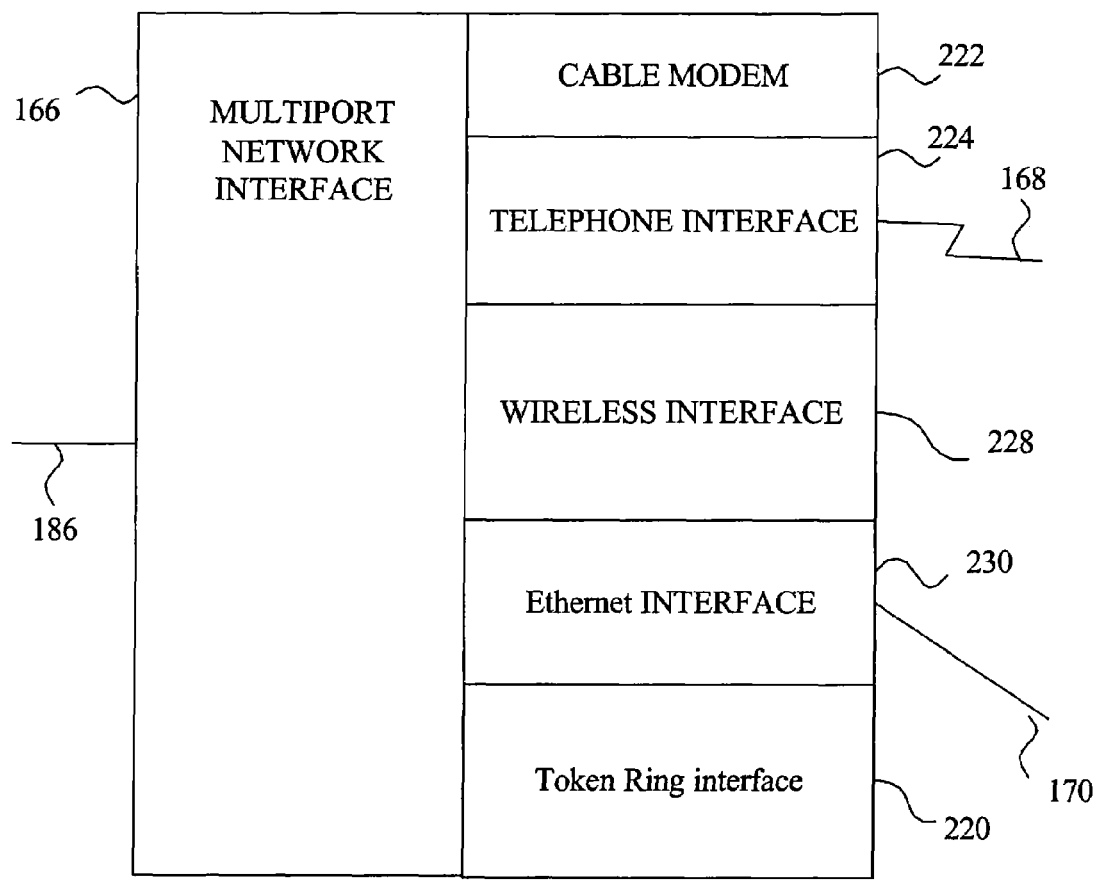
FIG. 4 illustrates details of the multi-port communication interface illustrated in FIG. 3.

FIG. 4 illustrates details of the multi-port network interface 166. The digital image forming device may communicate to external devices through a Token Rink interface 220, a cable modem unit 222 that has a high speed connection over cable, a conventional telephone interface 224 that connects to a telephone line 168, wireless interface 228, and an Ethernet interface 230. Other interfaces (not shown) include, but are not limited to, a Digital Subscriber line. The multi-port network interface does not need to have all the interfaces described in FIG. 4.

The CPU or other microprocessor or circuitry executes a monitoring process to monitor the state of each of the sensors of the digital copier/printer multi-function machine, and a sequencing process is used to execute the instructions of the code used to control and operate the machine. Additionally, there is (1) a central system control process executed to control the overall operation of the machine and (2) a communication process used to assure reliable communication to external devices connected to the digital copier/printer multi-function machine. The system control process monitors and controls data storage in a static state (e.g., the ROM 164 of FIG. 3), a semi-static state (e.g., the flash memory or disk 182), or a dynamic state (e.g., a volatile or non-volatile memory, the RAM 162 or the flash memory 178 or disk 182).

The above details have been described with respect to a digital copier/printer multi-function machine but the present invention is equally applicable to other business office machines or devices such as an analog copier, a facsimile machine, a scanner, a printer, a facsimile server, or other business office machines and business office appliance such as a router, firewall and small office router/firewall, or appliances (e.g., a microwave oven, digital camera, cellular phone, refrigerator, washer, dryer, visual audio system, DVD system and so on). Additionally, the present invention includes other types of devices that operate using store-and-forward or direction connection-based communication. Such devices include metering systems (including gas, water, or electricity metering systems), parking meters, vending machines, or any mechanical devices (e.g., automobiles) that need to be monitored and serviced during operation.

Figure 5:
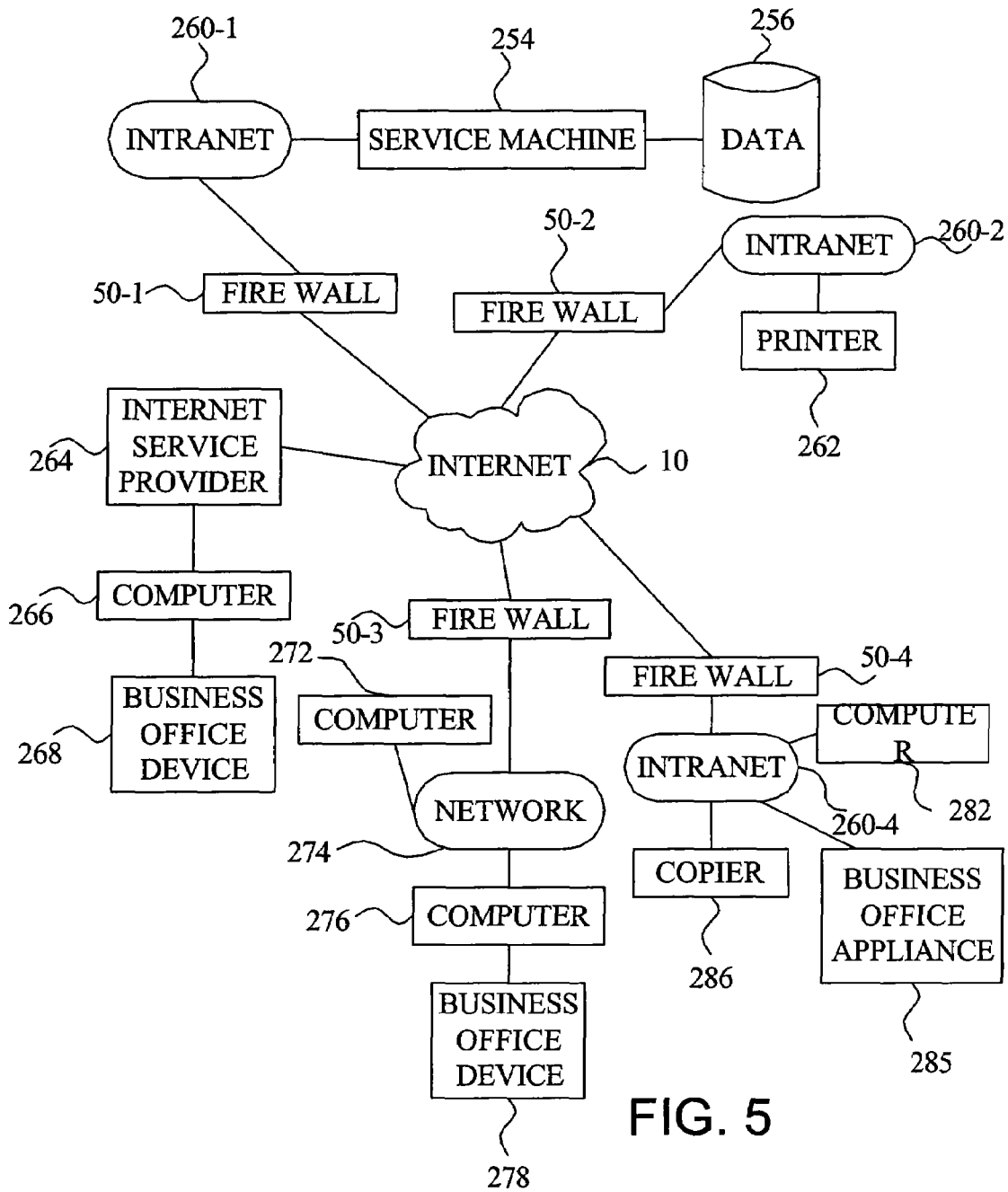
FIG. 5 illustrates an alternative system configuration in which business office devices are connected to a computer that is connected to a network, and also to devices that are connected directly to the network.

FIG. 5 illustrates an alternative system diagram of the invention in which different devices and subsystems are connected to the Internet 10. However, there is no requirement to have each of these devices or subsystems as part of the invention. Each component of the subsystem illustrated in FIG. 5 is individually part of the invention. Further, the elements illustrated in FIG. 1 may be connected to the Internet 10, which is illustrated in FIG. 5. In FIG. 5, there is illustrated a firewall 50-1 connected to an intranet 260-1. A service machine 254 connected to the intranet 260 includes therein or has connected thereto data 256, which may be stored in a database format. Alternatively, a service machine 254 is an abstract machine consisting of plural machines over the company intranet 260-1. Similarly, the data 256 may consist of plural databases spread over the intranet 260-1 or Storage Area Network (SAN) with several databases. The data 256 includes history, performance, malfunction, and any other information including statistical information of the operation or failure or set-up and components or optional equipment of devices and appliances that are being monitored. In addition, data of the devices and appliances interacts with other information, such as user and account information, in order to support the clients of devices and appliances.

Another sub-system of FIG. 5 includes a firewall 50-2, an intranet 260-2, and a printer 262 connected thereto. In this sub-system, the functions of sending and receiving electronic messages by the printer 262 (and similarly by a copier 286) are performed by (1) circuitry, (2) a microprocessor, or (3) any other type of hardware contained within or mounted to the printer 262 (i.e., without using a separate general purpose computer). Although this subsystem shows only one printer, there can be more printers attached to the intranet 260-2 and more than one computer that use the printer(s) are attached to 260-2.

An alternate type of sub-system includes the use of an Internet service provider 264, which may be any type of Internet service provider (ISP), including known commercial companies such as America Online, and Earthlink. In this sub-system, a computer 266 is connected to the ISP 264 through a telephone, cable, DSL, wireless, or fiber optic communication via modem or appropriate device. There may be a router/firewall device between the computer 266 and the modem. Further, a business office device 268 is connected to the computer 266. As an alternative to the business office device 268 (and any other device illustrated in FIG. 5), a different type of machine may be monitored or controlled such as a digital copier, any type of appliance, security system, or utility meter such as an electrical, water or gas utility meter or any other device discussed herein. These machines may be connected to the Internet 10 directly without going through the computer 266 wirelessly, for example.

Also illustrated in FIG. 5 is a firewall 50-3 connected to a network 274. The network 274 may be implemented as any type of computer network including LAN and WAN. Also, the network 274 may be implemented as an Intranet, if desired. A computer 272 connected to the network 274 may be used to obtain information from a business office device 278 and to generate reports such as reports showing problems that occurred in various machines connected to the network and a monthly usage report of the devices connected to the network 274. The computer 272 acts as a resource management function within a company. Alternatively, the Service Machine may provide the same functions and sends the report to the computer 272 or allows Web access for the report. In addition, the Service Machine may send an alert message to the computer 272 regarding the devices connected to the network. Such an alert message may be a jam or toner alert related to printers. In this embodiment, a computer 276 is connected between the business office device 278 and the network 274. This computer receives communications from the network and forwards the appropriate commands or data, or any other information to the business office device 278. Other network devices and appliances may be connected directly to Network 274. Communication between the business office device 278 and the computer 276 may be accomplished using wire-based or wireless methods including, but not limited to radio frequency connection, electrical connections and light connections (e.g., an infrared connection or a fiber optics connection). Similarly, each of the various networks and intranets illustrated in FIG. 5 may be established using any desired manner, including through the establishment of wireless networks such as radio frequency networks. The wireless communication described herein may be established using a spread spectrum technique that uses a spreading code and frequency hopping techniques such as the Bluetooth.

Another sub-system illustrated in FIG. 5 includes a firewall 50-4, an intranet 260-4, a computer 282 connected thereto, a business office appliance 285 and copier 286. The computer 282 may be used to access the service provided by the service machine 254 to check the company's aggregated data for an executive or may be used to interact with the service machine to support the devices on the intranet 260-4. Business office appliance 285 monitors the devices on the network including copier 286 or any of the other devices illustrated in or used with FIG. 5 which are covered by the contract and sends the monitored data to the service machine 254. The method of sending the monitored data includes e-mails, as described below.

Figure 6A:
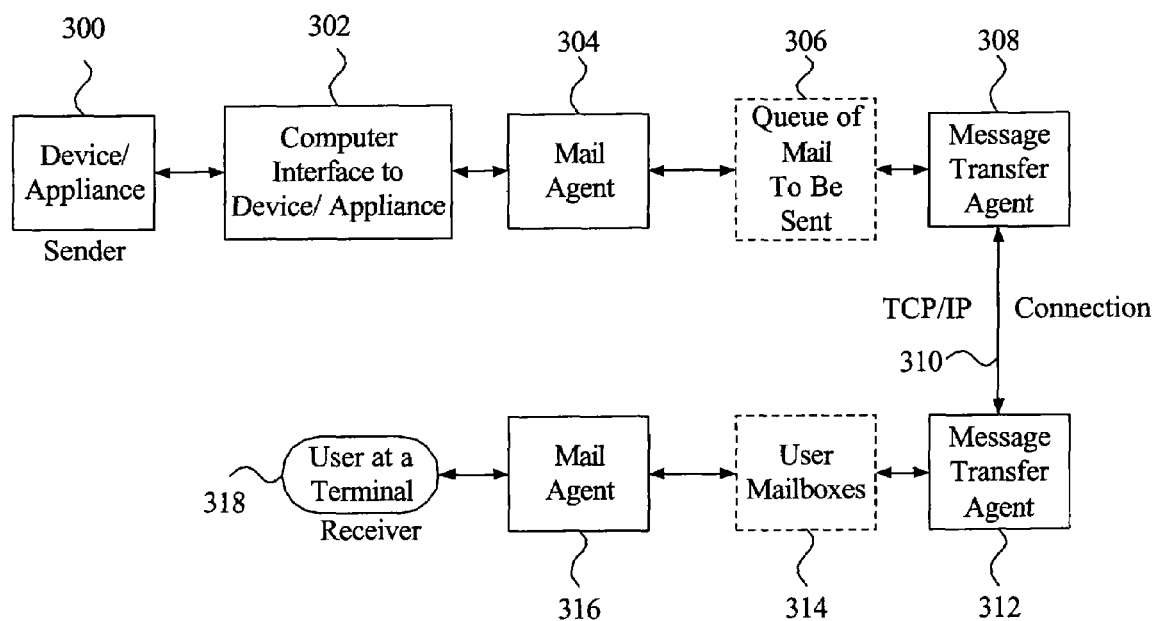
FIG. 6A is a black diagram illustrating the flow of information to and from an appliance/device using electronic mail.

FIG. 6A illustrates a device/appliance 300 connected to a typical e-mail exchange system, which includes components 302, 304, 306, 308, 310, 312, 314, 316, and 318, and which may be implemented in a conventional manner and are adapted from FIG. 28.1 of "TCP/IP Illustrated Volume 1" by Stevens, as mentioned above. A computer interface 302 interfaces with any of the application units or device/appliances 300 described herein. While FIG. 6A illustrates that the device/appliance 300 is the sender, the sending and receiving functions may be reversed in FIG. 6A. Furthermore, if desired, the user may not be needed to interface with device/appliance 300 at all. The computer interface 302 may interact with a mail agent 304. Popular mail agents for Windows are Outlook Express and Outlook. At the request of the computer interface 302, the mail agent 304 creates e-mail messages to be sent and, if desired, places these messages to be sent in a queue 306. The mail to be sent is forwarded to a Message Transfer Agent (MTA) 308. A common MTA for Unix system is Sendmail. Typically, the message transfer agents 308 and 312 exchange communication using a TCP/IP connection 310. Notably, the communication between message transfer agent 308 and 312 may occur over any size network (e.g., WAN or LAN). Further, the message transfer agents 308 and 312 may utilize any communication protocol. Internet Engineering Task Force (IETF) published a series of RFC documents at www.ietf.org/rfc.htm related to electronic mails including RFC 821 entitled "Simple Mail Transfer Protocol"; RFC 822 entitled "Standard for the Format of ARPA Internet Text Message"; RFC 2045 entitled "Multipurpose Internet Mail Extensions (MIME) Part One: Format of Internet Message Bodies"; RFC 1939 entitled "Post Office Protocol—Version 3". The contents of each of those references are incorporated herein by reference.

From the message transfer agent 212, e-mail messages are stored in user mailboxes 314, which are transferred to the mail agent 316 and ultimately transmitted to the user at the terminal 318, which functions as a receiving terminal. The user at a terminal 318 may, e.g., be a Resource Administrator or a remote controller which may, e.g., be notified in the event of equipment failure.

An e-mail system that uses a "store-and-forward" process relieves the need to have a direct connection between the sending terminal 302 and the receiving terminal 318. Most large companies prefer the device information to flow in one direction, not allowing the direct access to their internal network (intranet). In addition, the e-mails can be archived at the sending company's e-mail system, allowing audit trails if necessary.

Because the Internet is a network accessible by many users, it is not considered to be secure. Therefore, messages transmitted over the Internet can be encrypted to keep the messages confidential. Encryption mechanisms are known and widely used. Some operating systems come with encryption software. For example, SunOS 5.8 contains a crypt command to encrypt and decrypt the contents of a file.

Figure 6B:
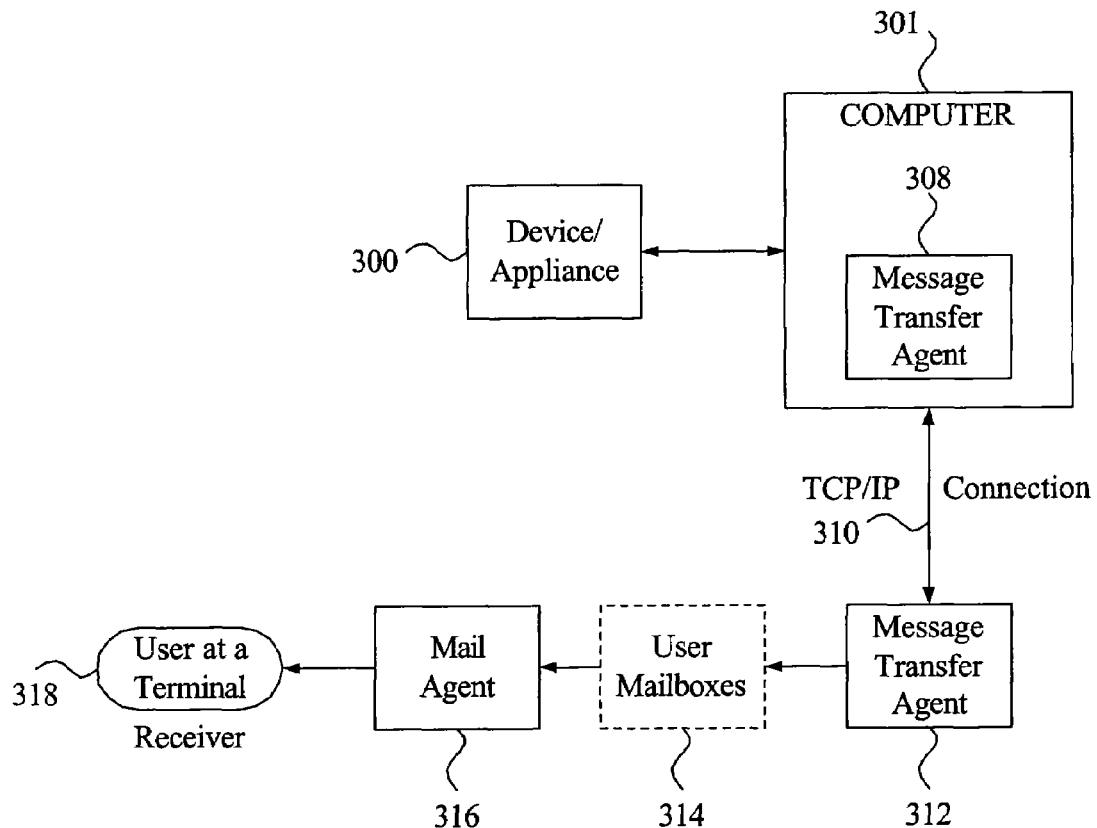
FIG. 6B illustrates an alternative way of communicating using electronic mail in which the computer that is connected to the device also serves as a message transfer agent.

As an alternative to the general structure of FIG. 6A, a single computer may be used that functions as the computer interface 302, the mail agent 304, the mail queue 306, and the message transfer agent 308. As illustrated in FIG. 6B, the device/appliance 300 is connected to a computer 301 that includes the message transfer agent 308.

Figure 6C:
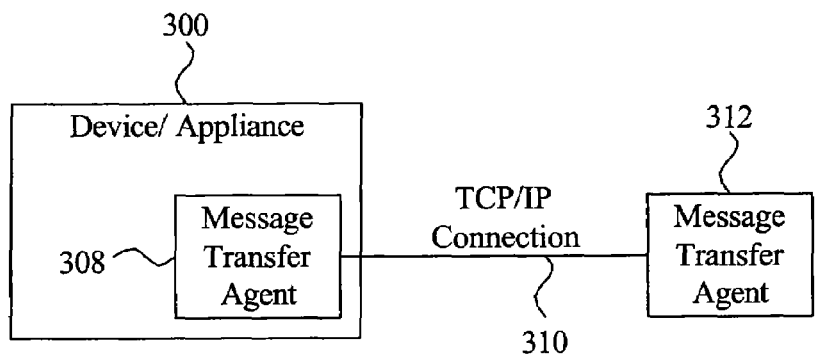
FIG. 6C illustrates an alternative manner of communicating using electronic mail in which the appliance/device includes a message transfer agent.

A further alternative structure is shown in FIG. 6C in which the message transfer agent 308 is formed as part of the device/appliance 300. Further, the message transfer agent 308 is connected to the message transfer agent 312 by a TCP/IP connection 310. In the embodiment of FIG. 6C, the device/appliance 300 is directly connected to the TCP/IP connection 310 and has an e-mail capability. Many printers, including those from HP and Xerox, have the capability to send alert notification to the registered e-mail addresses.

Figure 6D:
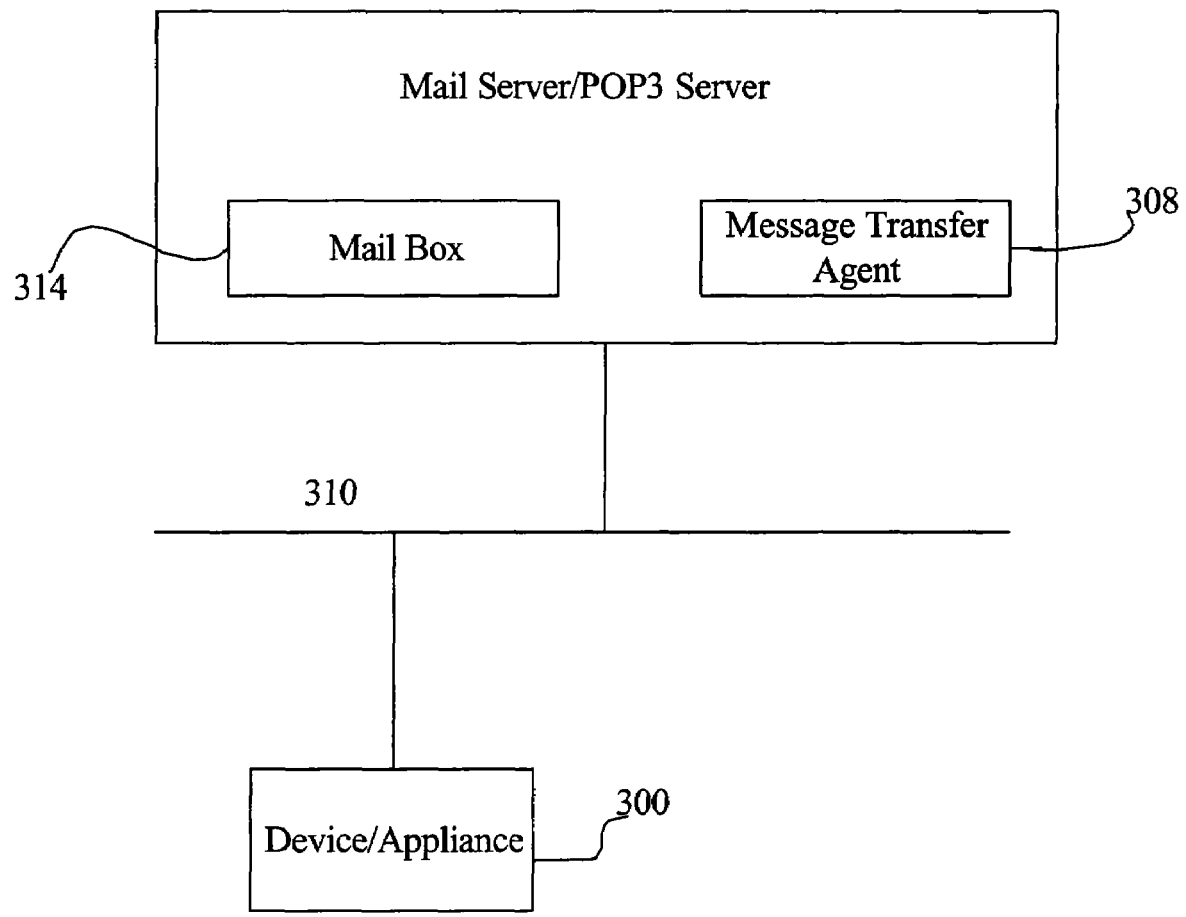
FIG. 6D illustrates an alternative way of communicating using electronic mail in which a mail server acts as a POP3 server to receive mail for an appliance/device and as an SMTP server to send mail for the appliance/device.

FIG. 6D illustrates a system in which a device/appliance 300 does not itself have the capability to directly receive e-mail, but has a connection 310 to a mail server/POP3 server, including a message transfer agent 308 and a mail box 314, so that the device/appliance 300 uses the POP3 protocol to retrieve received mail from the mail server.

Figure 7:
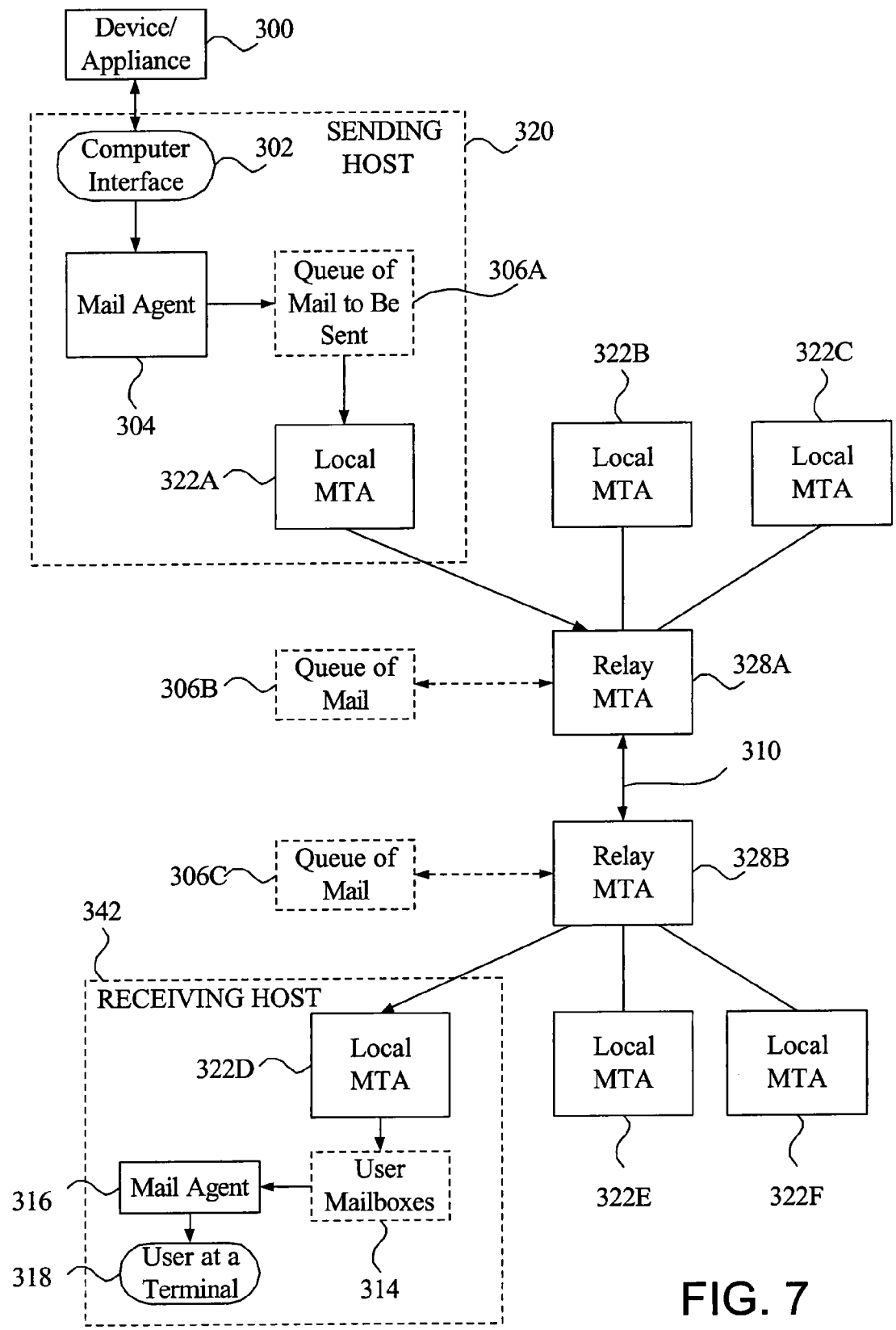
FIG. 7 illustrates an alternative manner of sending e-mail messages across the Internet.

FIG. 7 illustrates an alternative implementation of transferring mail and is adapted from FIG. 28.3 of "TCP/IP Illustrated Vol. 1" by Stevens referenced previously. FIG. 7 illustrates an electronic mail system having a relay system at each end. The arrangement of FIG. 7 allows one system at an organization to act as a mail hub. In FIG. 7, there are four MTAs connected between two mail agents 304 and 316. These MTAs include local MTA 322A, relay MTA 328A, relay MTA 328B, and local MTA 322D. The most common protocol used for mail messages is SMTP (Simple Mail Transfer Protocol), which may be used with this invention, although any desired mail protocol may be utilized. In FIG. 7, 320 designates a sending host which includes the computer interface 302, the mail agent 304, and the local MTA 322A. The device/appliance 300 is connected to or alternatively included within, the sending host 320. As another case, the device/appliance 300 and host 320 can be in one machine where the host capability is built into the device appliance 300. Other local MTAs 322B, 322C, 322E, and 322F may also be in the other computers or devices/appliances. Mail to be transmitted and received may be queued in a queue of mail 306B of the relay MTA 328A. The messages are transferred across the TCP/IP connection 310 (e.g., an Internet connection or a connection across any other type of network).

The transmitted messages are received by the relay MTA 328A and, if desired, stored in a queue of mail 306C. The mail is then forwarded to the local MTA 322D of a receiving host 342. The mail may be placed in one or more of the user mailboxes 314 and subsequently forwarded to the mail agent 316 and finally forwarded to the user at a terminal 318. If desired, the mail may be directly forwarded to the terminal without user interaction.

Figure 8:
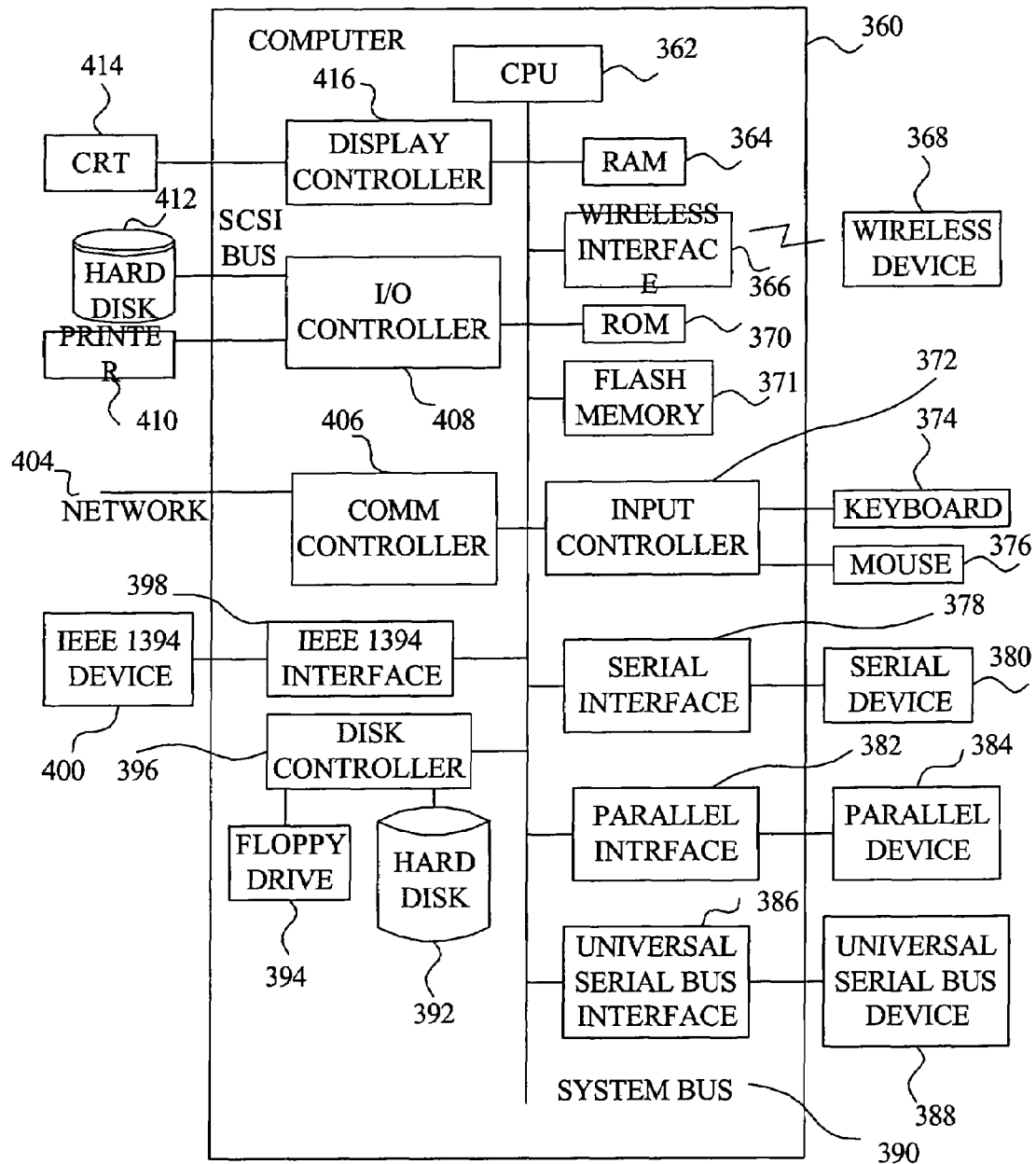
FIG. 8 illustrates an exemplary computer that may be connected to an appliance/device and is used to communicate electronic mail messages.

The various computers utilized by the present invention, including the computer 266 and 276 of FIG. 5, may be implemented as illustrated in FIG. 8. Further, any other computer or network appliance utilized by this invention may be implemented in a similar manner to the computer illustrated in FIG. 8, if desired, including the server machine 254, computer 272 and computer 282 of FIG. 5. However, not every element illustrated in FIG. 8 is required in each of those computers and appliances. In FIG. 8, the computer 360 includes a CPU 362 that may be implemented as any type of processor, including commercially available microprocessors from companies such as Intel, AMD, Motorola, Hitachi, IBM, and NEC. There is a working memory such as a RAM 364, and a wireless interface 366 which communicates with a wireless devices 368 or wireless network. The communication between the interface 366 and device 368 may use any wireless medium (e.g., radio waves or light waves).

There is provided a ROM 370 and a flash memory 371, although any other type of non-volatile memory (e.g., EPROM, or an EEPROM) may be utilized in addition to or in place of the flash memory 371. An input controller 372 has connected thereto a keyboard 374 and a mouse 376. There is a serial interface 378 connected to a serial device 380. Additionally, a parallel interface 382 is connected to a parallel device 384, a universal serial bus (USB) interface 386 is connected to USB device 388, and also there is an IEEE 1394 device 400, commonly referred to as a fire wire device, connected to an IEEE 1394 interface 398. The various elements of the computer 360 are connected by a system bus 390. A disk controller 396 is connected to a floppy disk drive 394 and a hard disk drive 392. A communication controller 400 allows the computer 360 to communicate with other computers (e.g., by sending e-mail messages) over a telephone line 402 or a network 404. An I/O (Input/Output) controller 408 is connected to a printer 410 and a hard disk 412, for example using a SCSI (Small Computer System Interface) bus. There is also a display controller 416 connected to CRT (Cathode Ray Tube) 414, although any type of display may be used including a liquid crystal display (LCD), a light emitted diode display, a plasma display, etc.

Figure 9:
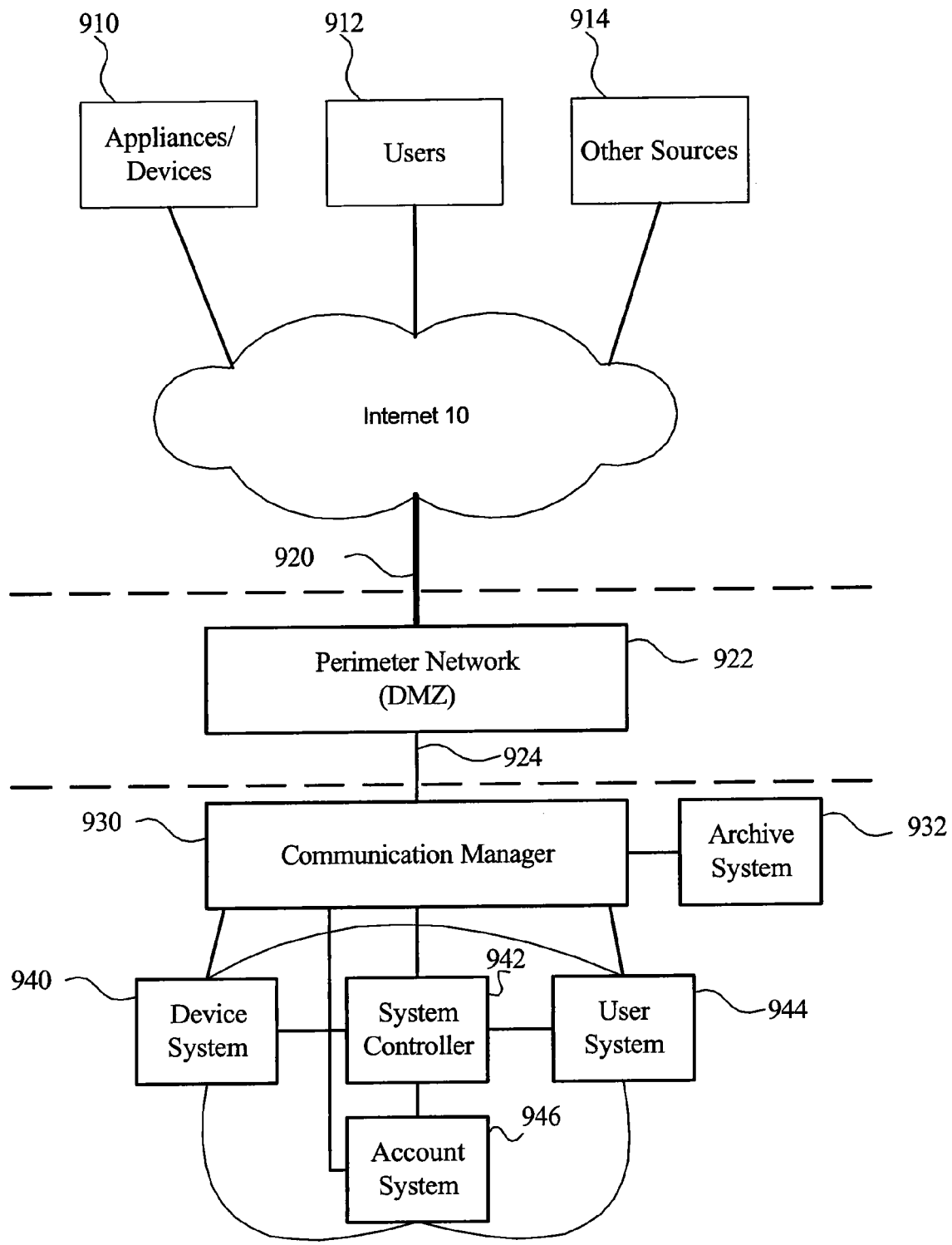
FIG. 9 illustrates an alternative system configuration in which a support system interacts with appliances/devices, users, and other sources and integrates the three component subsystems: Device, User, and Account.

FIG. 9 illustrates a more detailed block diagram related to elements 50-1, 260-1, 254 and 256 of FIG. 5, showing the functionality at a service provider. The service provider interacts with the outside through the Internet 10. Appliances/devices 910 send status information, configuration, and alert information. The information may be sent using electronic mail or using the HTTP protocol. The service provider may send some information such as a diagnostic inquiry and software updates to the appliances/devices 910. Users 912 send requests such as help desk service requests or information about the devices supported by the contract through the web site. Also, users 912 may receive, from the service provider, notifications such as order placement or service delivery schedule, the monthly report of the usage of appliances/devices, etc. Other sources 914, such as dealers or independent value added resellers, may send inquiry and report to the service provider. Also, other sources 914 may include an order of supplies and parts not covered by a particular maintenance contract. Perimeter Network 922 secures the internal network of the service provider by connected Internet 10 to the internal network 924 through the 920. Perimeter Network 922 contains the company's web site, FTP site, and routers, and forms a firewall. A more detailed discussion of firewalls can be found in "Building Internet Firewalls" by D. B. Chapmen and E. D. Zwicky, as discussed above. Finally, although 924 is shown as one line, it can be consider as a network of LANs or WANs.

The communication manager 930 manages the incoming and outgoing messages regarding client support. Attached to the communication manager 930 is the archive system 932 in which all incoming and outgoing communications for the client support are compressed and archived to maintain an audit trail for future use. The device system 940 contains information about the appliances and devices supported. The device system 940 contains historical information, configuration information, trouble information, service information, and all other information related to appliances/devices that was collected through the current system. The above information is connected through the unique identification of the appliances/devices, e.g., serial numbers. By analyzing the data in the device system 940, for example, the user can find which day of the week a particular appliance/device is used most, and which day of the month the appliance/device requires a service call.

The system controller 942 coordinates the information among the three systems 940, 944, and 946 so that clients are served optimally. The system controller 942 may utilize the stored and collected information to construct the context in which a particular request from a user must be handled. The user system 944 contains the information about all the users who use or may use the system. Such users include administrators, key operators, service technicians, sales operator, executives of clients, and the service provider. These users are also tied to their roles to play in the services provided so that the right users receive the right information. For example, an executive of a client company will not receive an alert message regarding a paper jam for a device to be serviced by a key operator. Also, a key operator will not be able to see financial aspects of the contract or aggregated usage information of appliances/devices and service calls.

Account system 946 comprises multiple subsystems including contracts, pricing, order management, billing, bid management, sales force automation, sales leads, etc. Account system 946 influences the entire processing and defines the business rules. For example, when a bid is pending, the service call processing might get high priority from the company to demonstrate the capabilities of the system.

The system according to an embodiment of the present invention allows a flexible response to the information coming from the various sources described above. For example, when an appliance/device sends alert messages, the response to the alerts may be different based upon the contract terms with the various companies. The same model of printers, for example, may send a "toner low" alert. If the contract covers the toner, the toner may be delivered to a key operator one day prior to the expected toner out date based upon the historical usage data of the printer. If the contract does not cover any action regarding the toner, the key operator may just receive an e-mail about the toner low alert with the link to the toner ordering web site.

Figure 10:
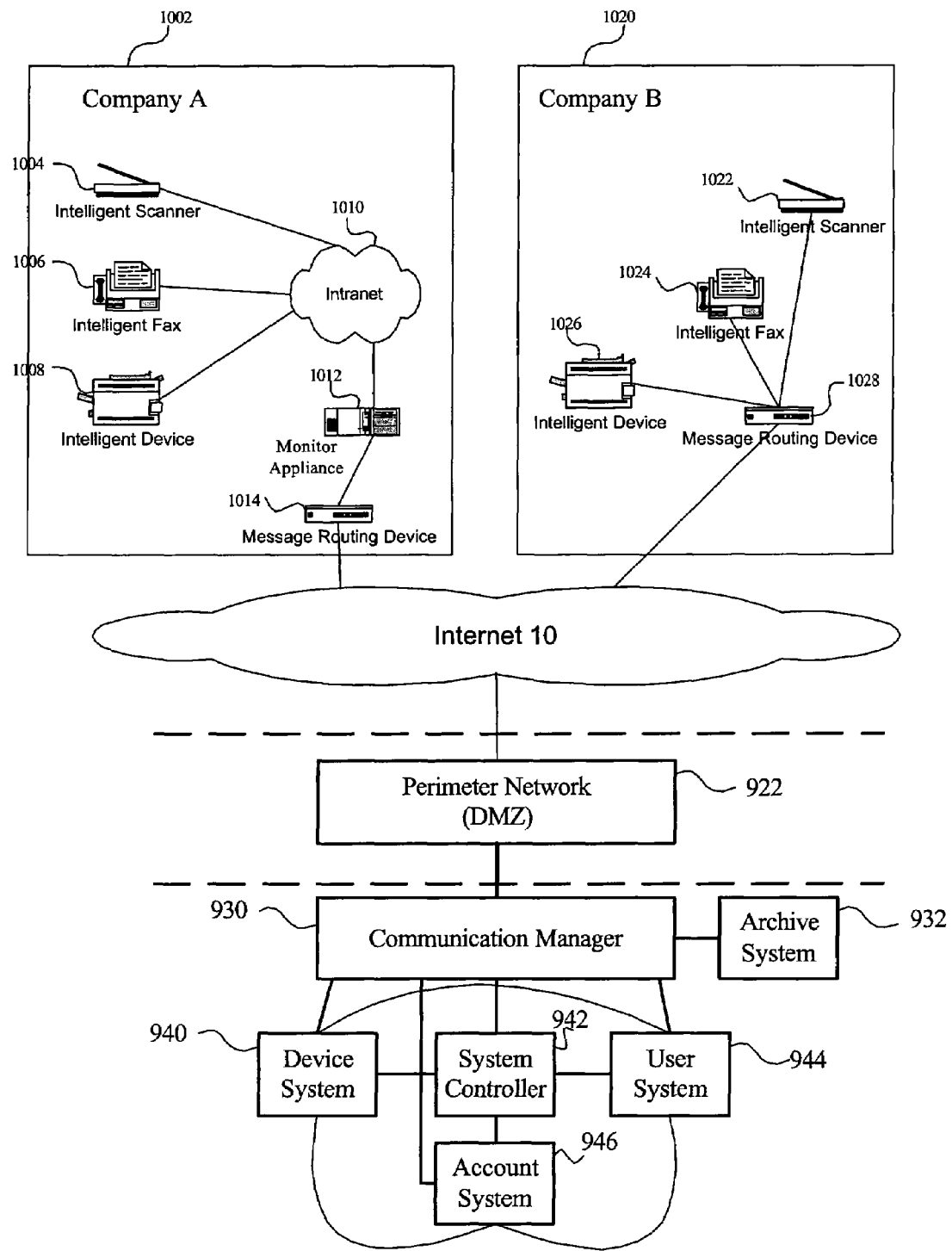
FIG. 10 illustrates appliance/device information interacting with a support system.

FIG. 10 illustrates two different methods to collect information from business office appliances/devices. In Company A, business office appliances/devices 1004, 1006, and 1008 are connected to Intranet 1010 and are monitored by a monitor appliance 1012. The data collected by this monitor appliance 1012 includes, but is not limited to, configuration information, alerts, warning and quantitative data, such as print counts and toner remaining. The monitor appliance 1012 sends and receives messages to the service provider periodically. Such messages can be electronic mail messages, SNMP messages, or messages sent through the HTTP protocol. The message routing device 1014 routes the messages from the monitor appliance to the Internet 10. Although message routing devices 1014 and 1028 are depicted as one device, they can be multiple devices, such as computers, routers, and switches, through the Intranet or WAN. When the monitor appliance 1012 receives messages from the service provider, the messages may be parsed, and if the action from the appliances/devices is needed, monitor appliance will send appropriate control commands. Examples of such actions may be software updates, diagnostic commands, and process parameter adjustments. In the case of Company B, business office appliances/devices 1022, 1024, and 1026 send and receive messages to and from the service provider periodically through message routing device 1028. All the messages regarding the appliances/devices are associated with unique identifications, such as serial numbers, so that the appliances/devices can be easily identified.

Figure 11:
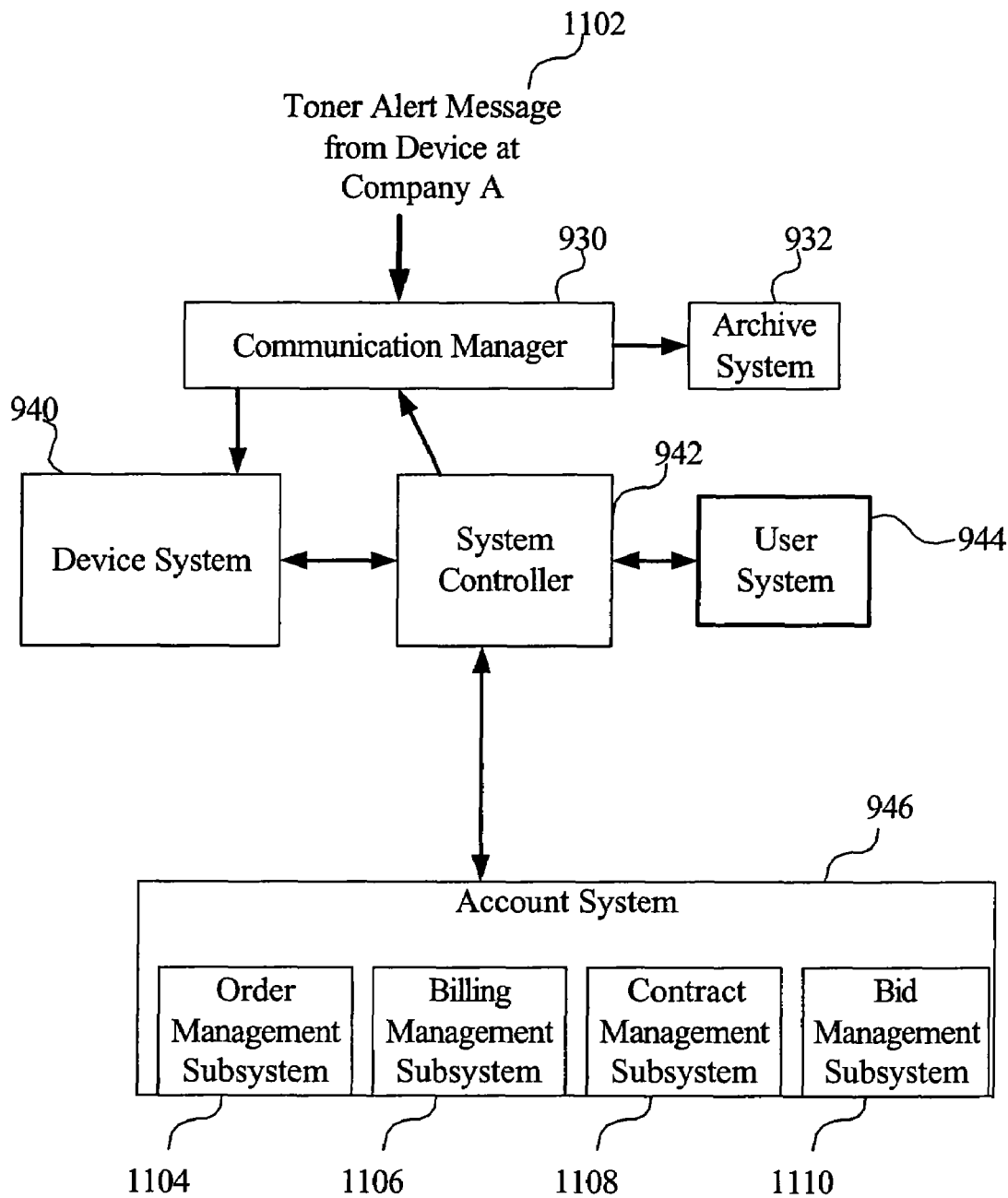
FIG. 11 illustrates an example of toner alert generated by a device at Company A.

FIG. 11 illustrates the processing of a toner alert from Company A. As described above, communication manager 930 receives the alert message 1102 and sends it to the archive system 932. Because it is an alert message regarding a particular appliance/device, the message is also sent to the device system 940 for processing. The device system 940 stores the alert message and recognizes the message to be a toner alert message. The device system 940 then sends the toner alert condition to the system controller 942 to process further. If the device system 940 has the corresponding company information, the device system 940 will also pass the company information to the system controller 942. Otherwise, the system controller 942 can interact with the account system 946 to find out the company information along with the contract and bidding status. The account system 946 includes the contract management subsystem 1108 that contains the contract information of each company along with the appliances/devices covered by the contract. The account system 946 also includes the bid management subsystem 1110 that contains the bidding information along with the trial conditions. The trial conditions will include the information about the appliances/devices involved in the trial. After the system controller 942 obtains the company information and the contract/bid status, controller 942 obtains user information, if it is covered by the contract. For example, suppose that Company A has a contract that covers the toner also. Then, the system controller 942 obtains from device system 940 the expected date of toner out for the device based upon the past usage pattern. Afterwards, the system controller places an order to the order management subsystem 1104 for the toner to be delivered to the key operator (whose information was obtained from the user system 944) one day prior to the expected toner out date. The system also sends to the key operator information regarding the toner delivery and expected delivery date. In addition, the billing management subsystem 1106 is notified. Because Company A's contract covers the toner, Company A will not receive an invoice for the toner order. In addition to these subsystems in the account system 946, the subsystems may be tied to other systems such as warehousing, supply chain, order-tracking and so on. Therefore, the subsystems described in this invention may be different in actual implementation depending upon a configuration of particular system.

Figure 12:
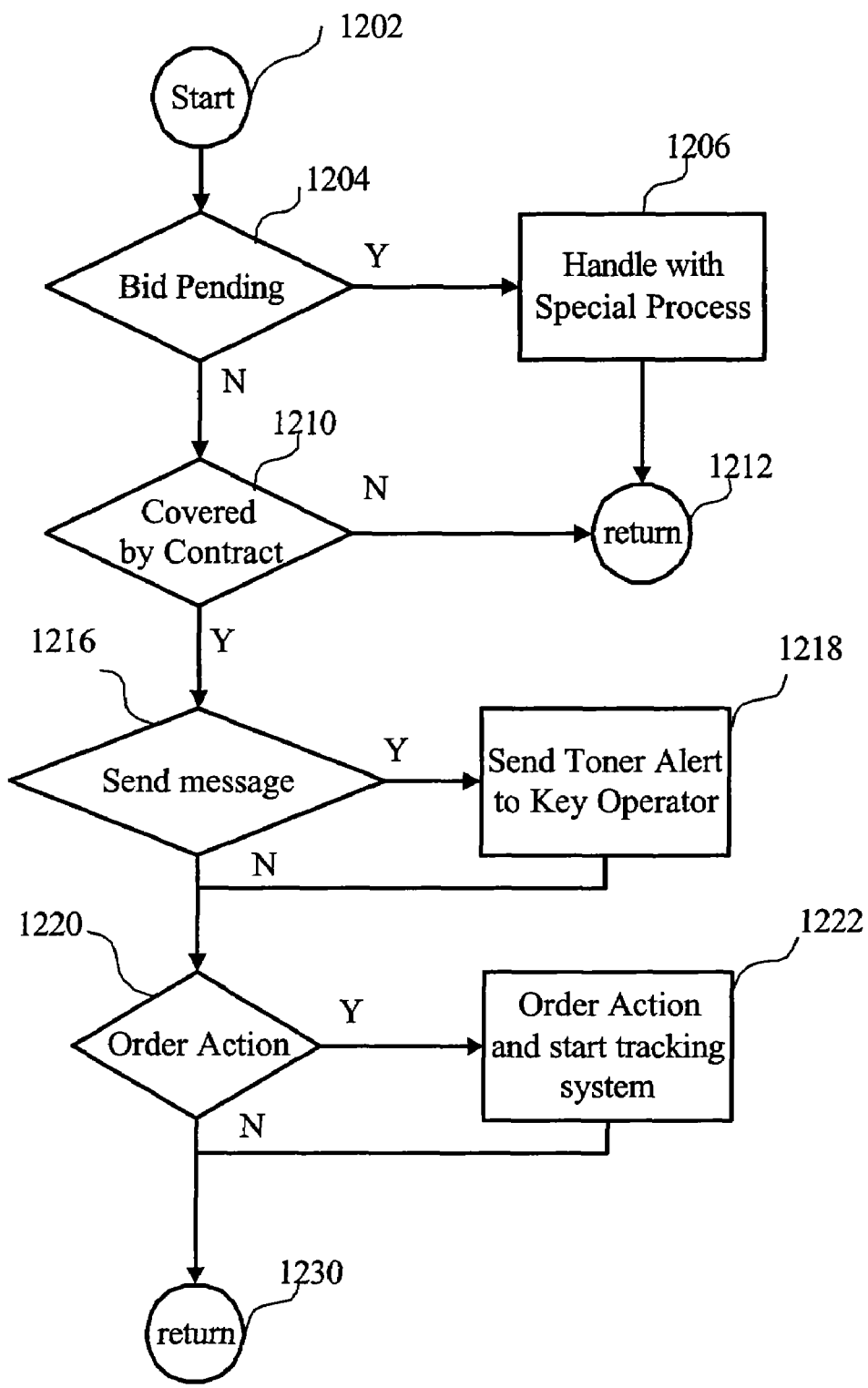
FIG. 12 is a flowchart illustrating the process to handle the illustrated toner alert.

FIG. 12 illustrates the general processing of an alert through the system controller after the information is processed at device system 940. The process checks if the bid is pending at step 1204. If the bid is pending, the case is handled through the special process at step 1206. The special process is controlled by bid management subsystem 1110. In one embodiment, the event is recorded for presentation. In another embodiment, the alert is taken care of by a service man and has highest priority. In yet another embodiment, the alert message is sent to specified destinations. The priority of handling the alert may be higher with the limited special database entries for most of the items. At step 1210, if the bid is not pending, the system checks if the appliance/device is covered by the contract. If it is not covered by the contract, the system returns at step 1212. Alternatively, if the device is not covered by a contract, if the system has some information about the person who might be interested in the appliance/ device, the system can send a mail or e-mail advertisement, e.g., for toner order. If e-mail is used, the mail body may contain web site information to place the order of the particular part/supply needed to correct the alert condition. If the alert is covered by the contract, the system checks to see if message of alert should be sent to the key operator at step 1216. Some contracts may require sending messages to key operators only. Some contracts may require sending the messages to key operators before taking action, and then sending the status of the taken action to the key operators. Some contracts may require taking corrective action first, and then reporting the status of that action. If the step 1216 determines that a message should be sent, the key operator from the user system 944 is notified. This out-going message is sent through the communication manager 930 and will be archived at the archive system 932. Then, in step 1220, the system checks if the contract covers taking action. If taking action is covered by the contract, the system places an order for the action. This action includes placing an order for the toner or placing order for a service person to visit the site. Once the order is placed, the key operator will be notified timely regarding the status of the order. These notifications will be sent through the communication manager 930 and will be archived by the archive system 932. It should be noted that each of the determinations made in steps 1204, 1210, 1216, and 1220, involve the account system 946.

Figure 13:
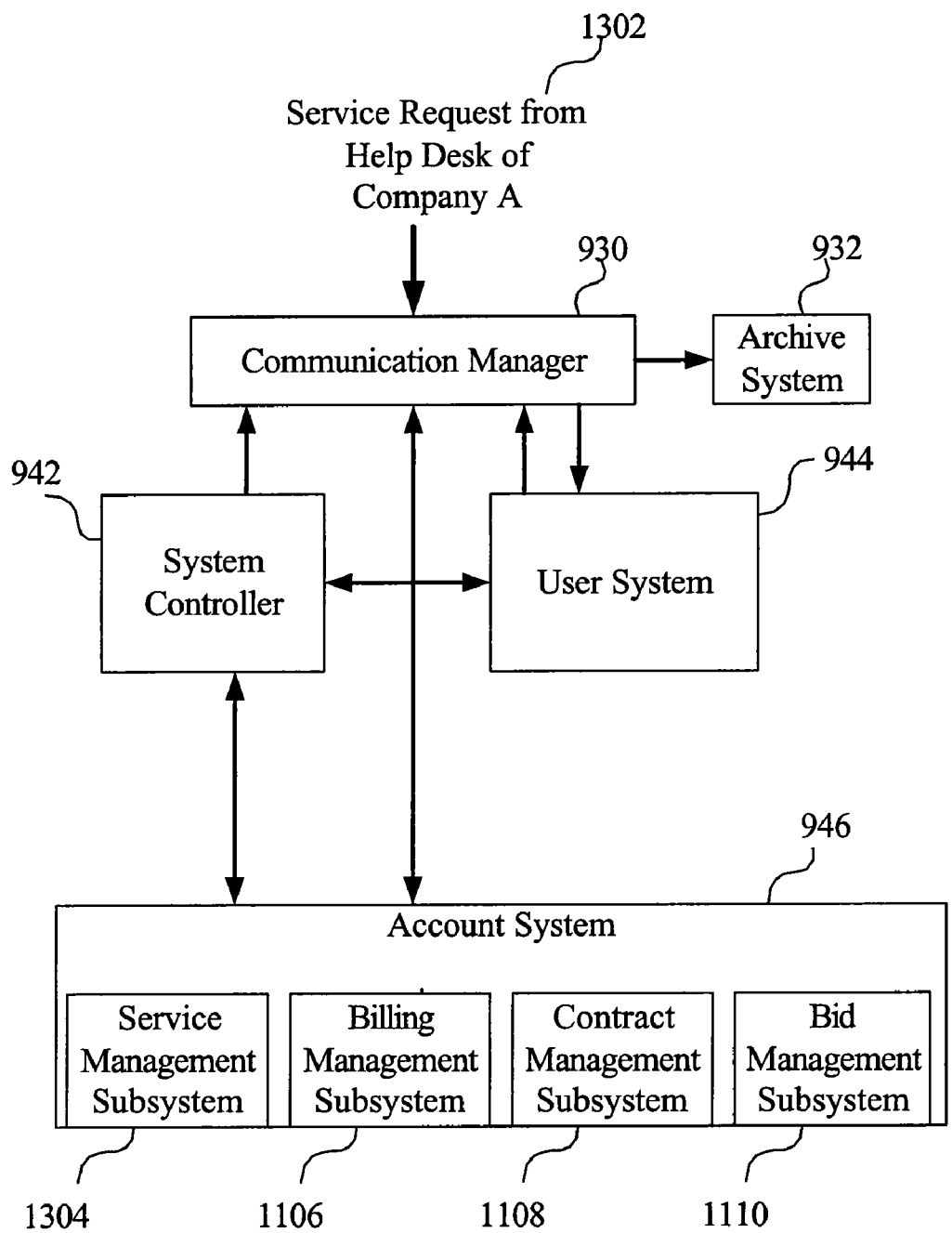
FIG. 13 illustrates an example of a service request from a Service Desk at Company A.

FIG. 13 illustrates the processing of a service request from the help desk of Company A. This service request may come in through the web site or e-mail and is received by communication manager 930. Alternatively, a person at the call center may receive the service request and may use the internal system to input the service request into the system. The communication manager 930 then archives the incoming messages in the archive system 932. Because the message originated from a user, the message is sent to the user system 944. After verifying the user and the incoming message, the message is parsed and sent to the system controller 942. The system controller 942 then consults with the account system 946 to check the bid status and the contract status of the device/appliance at Company A. If Company A is covered by the contract, the service call is placed and processed automatically through service management subsystem 1304 and the billing management subsystem is notified. In addition, the requester will be notified periodically regarding the status of the service call. The notifications to the requester shall be archived at the archive system 932 by communication manager 930. When the service is provided by a service person, the system at the help desk of Company A may be notified to clear the service pending status. If Company A is not covered by the contract, a service quote will be generated and sent to the requester.

Figure 14:
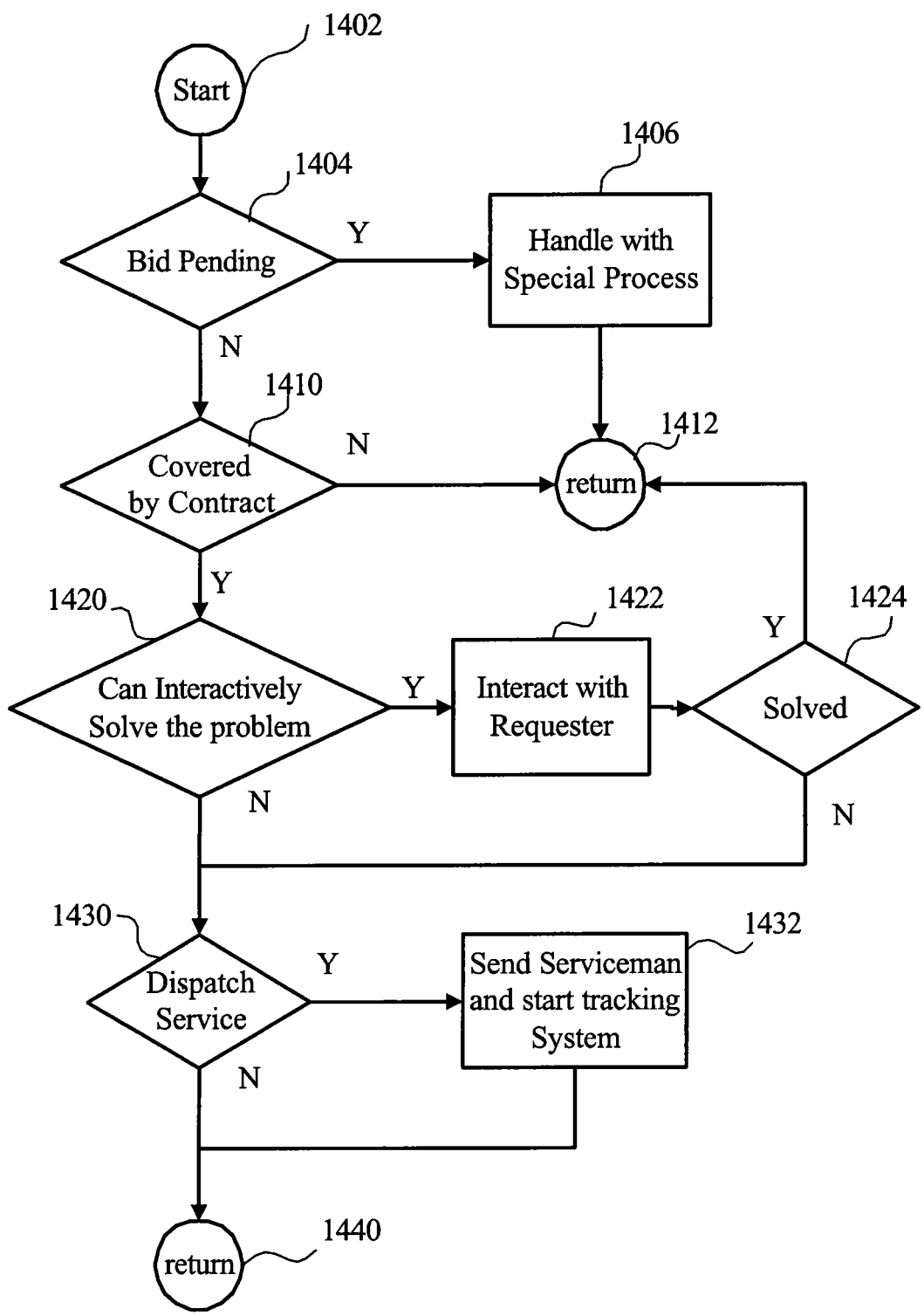
FIG. 14 is a flowchart illustrating a process to handle a request from a Help Desk.

FIG. 14 illustrates the general processing of the service request from a user or help desk after going through communication manager 930, device system 940, system controller 942, and user system 944. As discussed with regard to FIG. 12, the process first determines if a contract bid is pending at step 1404. If a bid is pending, the service request is handled by a special process in step 1406. The special process is controlled by bid management subsystem 1110. In one embodiment, the service calls are recorded and responded to without actually taking any actions to show the audit trails. In another embodiment, the service calls are entered and responded to with the highest priority to fix the problems. If a contract bid is not pending, the step 1410 determines whether the requester is covered by a contract. If the request is not covered by a contract, the process returns. Alternatively, a quote for an appropriate service corresponding to the request may be generated and transmitted. Another alternative is to send the Frequently Asked Question (FAQ) site for the related matters so that problems can be solved by going through the accumulated knowledge of the FAQ site. If the request is covered by a contract, the system determines whether the problem can be solved interactively. For example, past service requests and their solutions are stored in a knowledge base and the system might be able to suggest the solution to the requester if the requester is willing. If the requester wants to solve the problem interactively, the process interacts with the requester in step 1422, in consultation with the knowledge base. If the problem is solved at step 1424, the process returns to the calling system. Otherwise, the process goes to step 1430 if service is needed. If the contract does not allow for automatic serviceman dispatch, authorization may be required. In that case, the system can request the authorization. When a serviceman is dispatched, the status of the dispatching will be reported to the requester through the service management subsystem 1304. All the messages to the requester will be archived at the archive system 932 by the communication manager 930.

Figure 15:
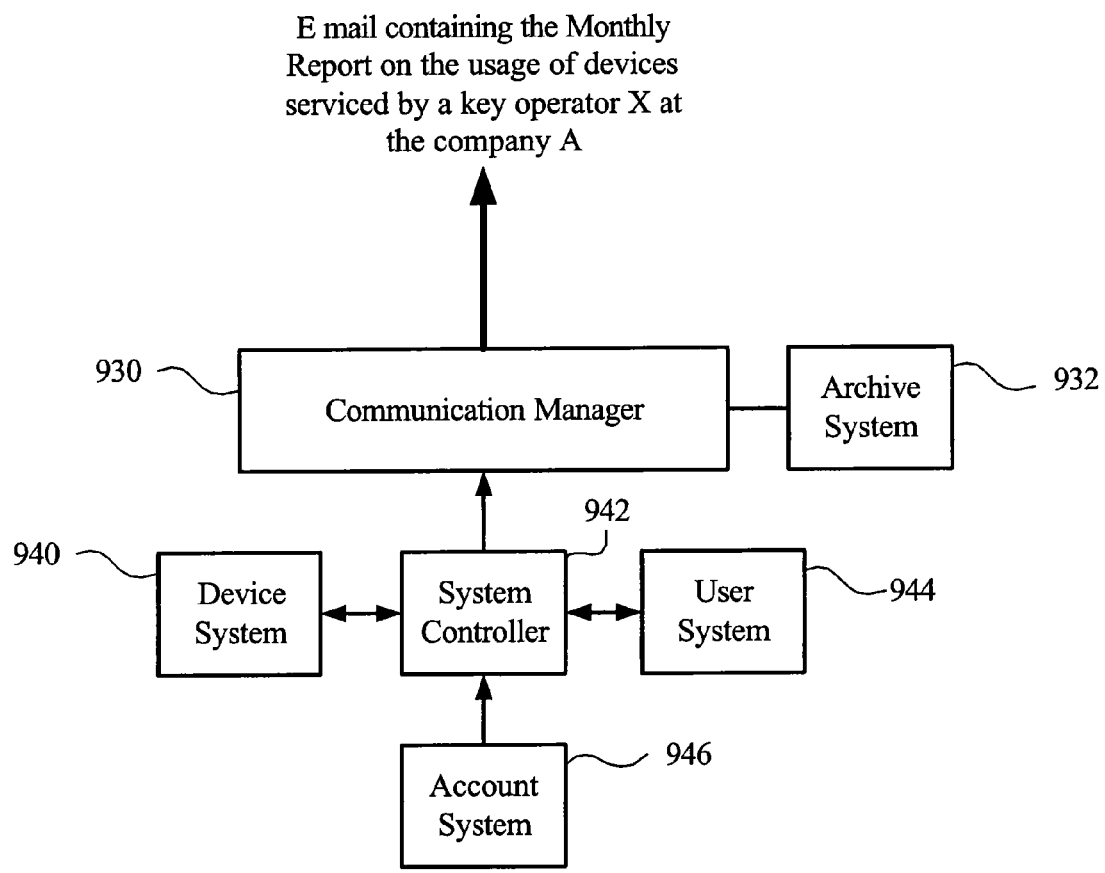
FIG. 15 illustrates an example of a monthly report sent at Company A.

FIG. 15 illustrates an example of a monthly email report service provided by the system of the present invention. The account system 946 checks the contract term and if the contract term covers the monthly usage report of the supported appliances/devices, the monthly report service for the company is setup. The account system triggers the reporting process by signaling to the system controller 942 on the particular day of the month. This triggering mechanism may also send some information, such as the company name, service call information, and supply order information during the previous month. The system controller then collects the additional necessary information from the device system 940 and information regarding the person to send the report to from the user system 944. The reason for this check is that the destination may change after the contract is signed. The report is then generated by the system controller through the support system (not illustrated) in the format choice of the client, such as HTML, plain text, or Excel. The report may include monthly print volume of each devices and service calls associated with the device, supplies delivered during the month, and average response time for the service call. The contents to be included in the report are specified in the contract. The report is sent through the communication manager 930, which archives the message in the archive system 932.

Figure 16:
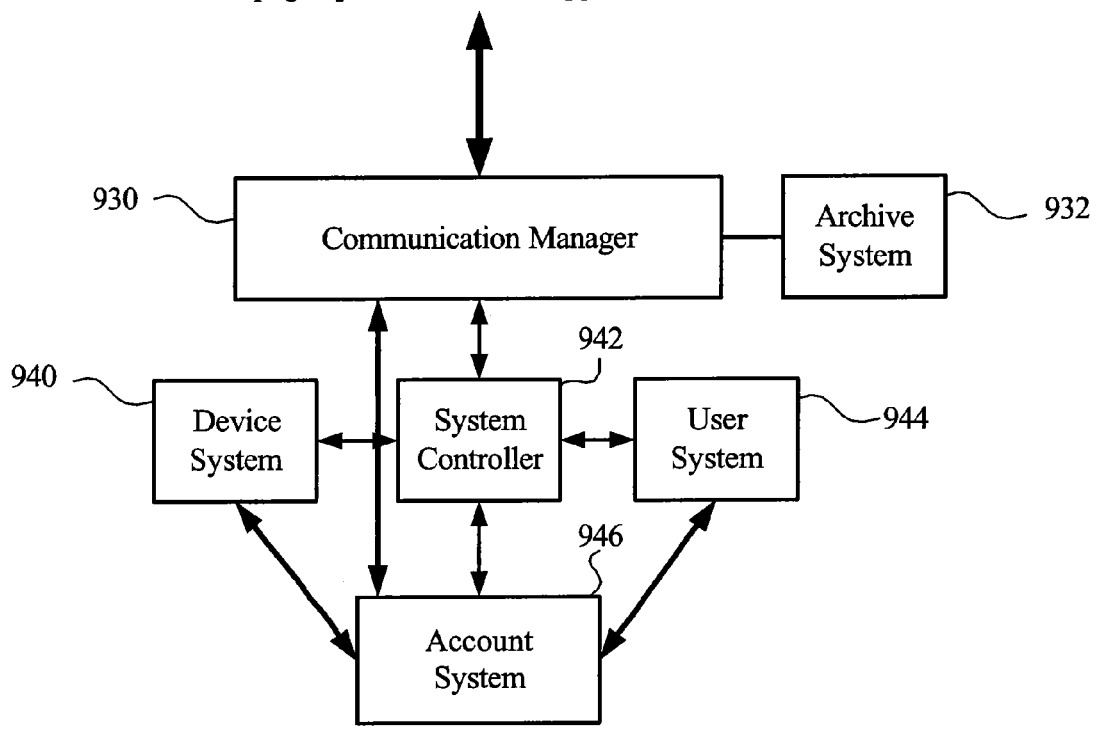
FIG. 16 illustrates an example of an interaction between an executive at Company A and an embodiment of the present invention.

FIG. 16 illustrates another example of service to a client according to the present invention. An executive of a company may have some questions about the contract and dealings with the service provider in order to assess the business, such as the return on investment. In such a case, the executive can use the web site provided by the service provider to extract the necessary information, such as total service calls and total down times for various devices. When the executive logs into the web site, using a password, for example, the system controller would verify the contract through the account system 946, and the user covered by the contract through the user system 944. Because the executive is not likely to be interested in a detailed history of the appliances/ devices, the aggregated data are generated by the device system 940 and stored in the account system. The aggregated data are updated as the device system 940 changes the raw data. Normally, after a login session, the executive is likely to interact with the account system 946. If the executive is interested in more detailed data of specific appliances/devices, the system controller 942 can pull the data from the device system 940. As discussed above, the contents of each communication will be archived in the archive system 932 through the communication manager 930.

Figure 17:
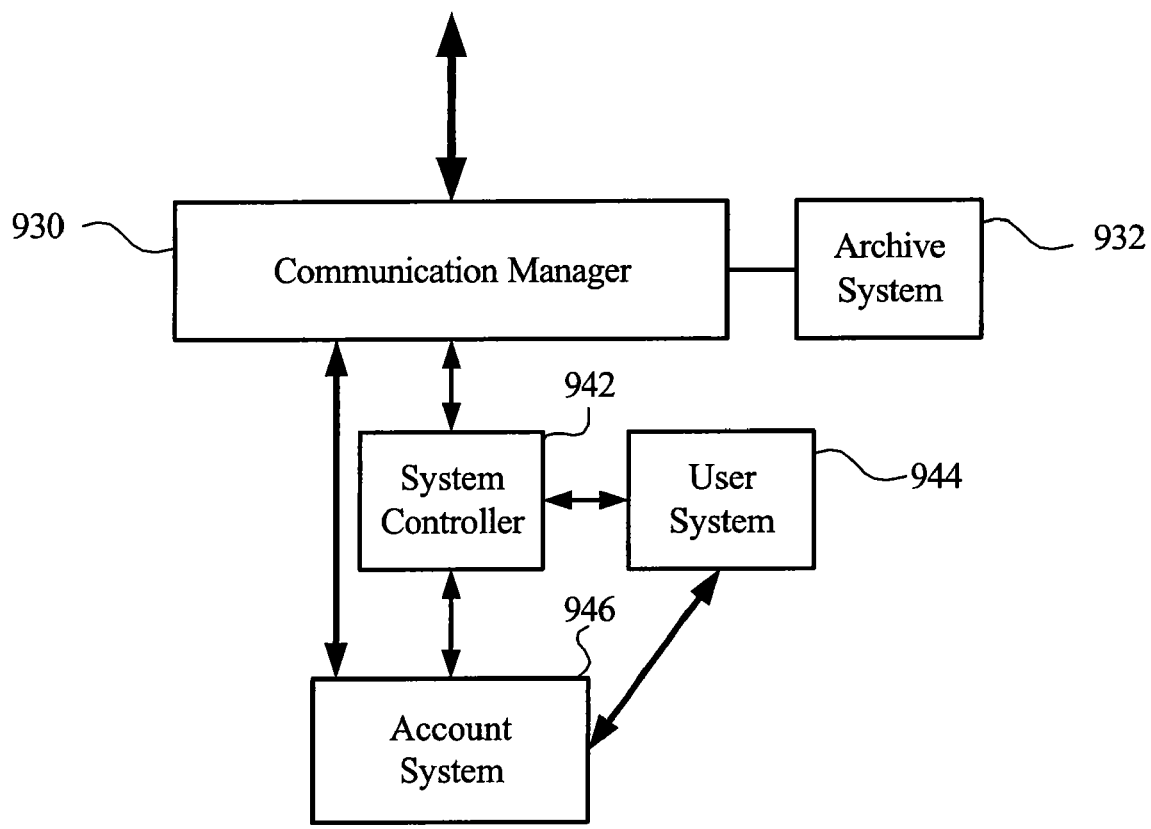
FIG. 17 illustrates an example of the use of an embodiment of the present invention by an executive at a company for the purpose of business assessment.

FIG. 17 illustrates an example of how the system can be used by the service provider company. An executive of the service provider company can track the contract terms and profitability. The executive can log into the system through an Intranet. The system controller can verify the user of the system from the user system 944 for the particular request. After logging on to the system, the executive can get information regarding the cost of providing the services to a particular contract and the income from the contract. The cost information can be determined from all the services provided to the contract company such as toner supplies, serviceman calls, etc., which is stored in the account system 946. Therefore, the detailed cost breakdown can be provided to the executive to assist the analysis of the contract and its profitability.

The invention claimed is:

1. A method of managing and servicing at least one device communicatively coupled to a network with a monitoring apparatus, comprising:

receiving, at a network interface of the monitoring apparatus, device information, including at least one of alert information and status information pertaining to the device, from the at least one device over the network;

storing, in a digital depository, the received device information;

storing, in the digital depository, business context information, including contract management information that indicates which devices are covered by a contract with a service provider, and at least one of billing management information and order management information related to managing and servicing the at least one device;

storing, in the digital depository, user access information, the user access information governing access to the stored device information and the stored business context information of the at least one device by a plurality of users;

providing, at the monitoring apparatus, at least one of the stored device information and the business context information to a user of the plurality of users based on the stored user access information;

determining, at the monitoring apparatus, by interfacing with a digital system that stores the contract management information, whether the at least one device is to be serviced under the contract based on the contract management information that indicates which devices are covered by the contract;

automatically placing and processing, at the monitoring apparatus, a service call for the at least one device through a service management subsystem if the at least one device is to be serviced under the contract based on the contract management information; and generating and sending, at the monitoring apparatus, a service quote to a sender of the device information if the at least one device is not to be serviced under the contract based on the contract management information.

2. The method of claim 1, further comprising:
creating a usage report for the at least one device based on the stored device information.

3. The method of claim 2, wherein the providing step comprises:
automatically sending, to said user, an electronic mail message including the usage report and the at least one of the stored device information and the business context information.

4. The method of claim 2, wherein the providing step comprises:
providing, to said user, the usage report and the at least one of the stored device information and the business context information on a website.

5. The method of claim 2, wherein the usage report includes, for a predetermined period of time, at least one of print volume of the at least one device, information of service calls for the at least one device, supplies delivered during the predetermined period of time for the at least one device, and average response time for the service calls.

6. The method of claim 2, wherein a type of information included in the usage report is specified in a service contract covering the at least one device.

7. The method of claim 1, wherein the providing step comprises:
receiving, over the network, an identification of said user;
determining, based on the user access information and the received identification, whether to provide the at least one of the stored device information and the business context information to said user.

8. The method of claim 7, wherein the identification is a password.

9. The method of claim 1, further comprising:
receiving a request for the at least one of the stored device information and the business context information from said user.

10. A system for managing and servicing at least one device communicatively coupled to a network, comprising:

means for receiving device information, including at least one of alert information and status information pertaining to the device, from the at least one device over the network;

means for storing the received device information;

means for storing business context information, including contract management information that indicates which devices are covered by a contract with a service provider, and at least one of billing management information and order management information related to managing and servicing the at least one device;

means for storing user access information, the user access information governing access to the stored device information and the stored business context information of the at least one device by a plurality of users;

means for providing at least one of the stored device information and the business context information to a user of the plurality of users based on the stored user access information;

means for determining, by interfacing with digital system that stores the contract management information, whether the at least one device is to be serviced under the contract based on the contract management information that indicates which devices are covered by the contract;

means for automatically placing and processing a service call for the at least one device through a service management subsystem if the at least one device is to be serviced under the contract based on the contract management information; and means for generating and sending a service quote to a sender of the device information if the at least one device is not to be serviced under the contract based on the contract management information.

11. The system of claim 10, further comprising:
means for creating a usage report for the at least one device based on the stored device information.

12. The system of claim 11, wherein the means for providing comprises:
means for automatically sending, to said user, an electronic mail message including the usage report and the at least one of the stored device information and the business context information.

13. The system of claim 11, wherein the means for providing comprises:
means for providing, to said user, the usage report and the at least one of the stored device information and the business context information on a website.

14. The system of claim 11, wherein the usage report includes, for a predetermined period of time, at least one of print volume of the at least one device, information of service calls for the at least one device, supplies delivered during the predetermined period of time for the at least one device, and average response time for the service calls.

15. The system of claim 11, wherein a type of information included in the usage report is specified in a service contract covering the at least one device.

16. The system of claim 10, wherein the means for providing comprises:
means for receiving, over the network, an identification of said user;
means for determining, based on the user access information and the received identification, whether to provide the at least one of the stored device information and the business context information to said user.

17. The system of claim 16, wherein the identification is a password.

18. The system of claim 10, further comprising:
means for receiving a request for the at least one of the stored device information and the business context information from said user.

19. A computer readable storage medium encoded with instructions, which when executed by a monitoring apparatus causes the monitoring apparatus to implement a method of managing and servicing at least one device communicatively coupled to a network, comprising:
receiving, at a network interface of the monitoring apparatus, device information, including at least one of alert information and status information pertaining to the device, from the at least one device over the network;
storing, in a digital depository, the received device information;
storing, in the digital depository, business context information, including contract management information that indicates which devices are covered by a contract with a service provider, and at least one of billing management information and order management information related to managing and servicing the at least one device;
storing, in the digital depository, user access information, the user access information governing access to the stored device information and the stored business context information of the at least one device by a plurality of users;
providing, at the monitoring apparatus, at least one of the stored device information and the business context information to a user of the plurality of users based on the stored user access information;
determining, at the monitoring apparatus, by interfacing with a digital system that stores the contract management information, whether the at least one device is to be serviced under the contract based on the contract management information that indicates which devices are covered by the contract;
automatically placing and processing, at the monitoring apparatus, a service call for the at least one device through a service management subsystem if the at least one device is to be serviced under the contract based on the contract management information; and
generating and sending, at the monitoring apparatus, a service quote to a sender of the device information if the at least one device is not to be serviced under the contract based on the contract management information.

20. The computer readable storage medium of claim 19, wherein the method further comprises:
creating a usage report for the at least one device based on the stored device information.

21. The computer readable storage medium of claim 20, wherein the providing comprises:
automatically sending, to said user, an electronic mail message including the usage report and the at least one of the stored device information and the business context information.

22. The computer readable storage medium of claim 20, wherein the providing comprises:
providing, to said user, the usage report and the at least one of the stored device information and the business context information on a website.

23. The computer readable storage medium of claim 20, wherein the usage report includes, for a predetermined period of time, at least one of print volume of the at least one device, information of service calls for the at least one device, supplies delivered during the predetermined period of time for the at least one device, and average response time for the service calls.

24. The computer readable storage medium of claim 20, wherein a type of information included in the usage report is specified in a service contract covering the at least one device.

25. The computer readable storage medium of claim 19, wherein the providing comprises:
receiving, over the network, an identification of said user; and
determining, based on the user access information and the received identification, whether to provide the at least one of the stored device information and the business context information to said user.

26. The computer readable storage medium of claim 25, wherein the identification is a password.

27. The computer readable storage medium of claim 19, wherein the method further comprises:
receiving a request for the at least one of the stored device information and the business context information from said user.

28. A method of managing and servicing at least one device communicatively coupled to a network with a monitoring apparatus, comprising:
receiving, at a network interface of the monitoring apparatus, device information, including at least one of alert information and status information pertaining to the device, from the at least one device over the network;

storing, in a digital depository, the received device information;

storing, in the digital depository, business context information, including contract management information that indicates which devices are covered by a contract with a service provider, and at least one of billing management information and order management information related to managing and servicing the at least one device;

storing, in the digital depository, user access information, the user access information governing access to the stored device information and the stored business context information of the at least one device by a plurality of users, wherein the storing user access information includes storing, in correspondence with the user access information, information indicating which alert message each of the plurality of users is to receive;

providing, at the monitoring apparatus, at least one of the stored device information and the business context information to a user of the plurality of users based on the stored user access information;

determining, at the monitoring apparatus, by interfacing with a digital system that stores the contract management information, whether the at least one device is to be serviced under the contract based on the contract management information that indicates which devices are covered by the contract; and sending an alert message, wherein the sending includes determining a subject matter of the alert message, and determining which user of the plurality of users is to receive the alert message based on the information indicating which alert message each of the plurality of users is to receive.

29. A system for managing and servicing at least one device communicatively coupled to a network, comprising:

means for receiving device information, including at least one of alert information and status information pertaining to the device, from the at least one device over the network;

means for storing the received device information;

means for storing business context information, including contract management information that indicates which devices are covered by a contract with a service provider, and at least one of billing management information and order management information related to managing and servicing the at least one device;

means for storing user access information, the user access information governing access to the stored device information and the stored business context information of the at least one device by a plurality of users, wherein the means for storing user access information includes means for storing, in correspondence with the user access information, information indicating which alert message each of the plurality of users is to receive;

means for providing at least one of the stored device information and the business context information to a user of the plurality of users based on the stored user access information;

means for determining, by interfacing with digital system that stores the contract management information, whether the at least one device is to be serviced under the contract based on the contract management information that indicates which devices are covered by the contract; and means for sending an alert message, wherein the means for sending includes means for determining a subject matter of the alert message, and means for determining which user of the plurality of users is to receive the alert message based on the information indicating which alert message each of the plurality of users is to receive.

30. A computer readable storage medium encoded with instructions, which when executed by a monitoring apparatus causes the monitoring apparatus to implement a method of managing and servicing at least one device communicatively coupled to a network, comprising:

receiving, at a network interface of the monitoring apparatus, device information, including at least one of alert information and status information pertaining to the device, from the at least one device over the network;

storing, in a digital depository, the received device information;

storing, in the digital depository, business context information, including contract management information that indicates which devices are covered by a contract with a service provider, and at least one of billing management information and order management information related to managing and servicing the at least one device;

storing, in the digital depository, user access information, the user access information governing access to the stored device information and the stored business context information of the at least one device by a plurality of users, wherein the storing user access information includes storing, in correspondence with the user access information, information indicating which alert message each of the plurality of users is to receive;

providing, at the monitoring apparatus, at least one of the stored device information and the business context information to a user of the plurality of users based on the stored user access information;

determining, at the monitoring apparatus, by interfacing with a digital system that stores the contract management information, whether the at least one device is to be serviced under the contract based on the contract management information that indicates which devices are covered by the contract;

sending an alert message, wherein the sending includes determining a subject matter of the alert message, and determining which user of the plurality of users is to receive the alert message based on the information indicating which alert message each of the plurality of users is to receive.

31. The method of claim 28, further comprising:

creating a usage report for the at least one device based on the stored device information.

32. The method of claim 31, wherein the providing step comprises:

automatically sending, to said user, an electronic mail message including the usage report and the at least one of the stored device information and the business context information.

33. The method of claim 31, wherein the providing step comprises:

providing, to said user, the usage report and the at least one of the stored device information and the business context information on a website.

34. The method of claim 31, wherein the usage report includes, for a predetermined period of time, at least one of print volume of the at least one device, information of service calls for the at least one device, supplies delivered during the predetermined period of time for the at least one device, and average response time for the service calls.

35. The method of claim 31, wherein a type of information included in the usage report is specified in a service contract covering the at least one device.

36. The system of claim 29, further comprising:
means for creating a usage report for the at least one device based on the stored device information.

37. The system of claim 36, wherein the means for providing comprises:
means for automatically sending, to said user, an electronic mail message including the usage report and the at least one of the stored device information and the business context information.

38. The system of claim 36, wherein the means for providing comprises:
means for providing, to said user, the usage report and the at least one of the stored device information and the business context information on a website.

39. The system of claim 36, wherein the usage report includes, for a predetermined period of time, at least one of print volume of the at least one device, information of service calls for the at least one device, supplies delivered during the predetermined period of time for the at least one device, and average response time for the service calls.

40. The system of claim 36, wherein a type of information included in the usage report is specified in a service contract covering the at least one device.

41. The computer readable storage medium of claim 30, wherein the method further comprises:
creating a usage report for the at least one device based on the stored device information.

42. The computer readable storage medium of claim 41, wherein the providing comprises:
automatically sending, to said user, an electronic mail message including the usage report and the at least one of the stored device information and the business context information.

43. The computer readable storage medium of claim 41, wherein the providing comprises:
providing, to said user, the usage report and the at least one of the stored device information and the business context information on a website.

44. The computer readable storage medium of claim 41, wherein the usage report includes, for a predetermined period of time, at least one of print volume of the at least one device, information of service calls for the at least one device, supplies delivered during the predetermined period of time for the at least one device, and average response time for the service calls.

45. The computer readable storage medium of claim 41, wherein a type of information included in the usage report is specified in a service contract covering the at least one device.

* * * * *